US011959600B2

(12) United States Patent
Hurduc et al.

(10) Patent No.: US 11,959,600 B2
(45) Date of Patent: Apr. 16, 2024

(54) FLAMELESS CANDLE WITH FLOATING FLAME ELEMENT

(71) Applicant: Sterno Home Inc., Vancouver (CA)

(72) Inventors: Lucian Hurduc, Ste-Julie (CA); Frederic Boucher, Delson (CA); Carl Marinier, Sainte-Catherine (CA)

(73) Assignee: The Sterno Group LLC, Corona, CA (US)

( * ) Notice: Subject to any disclaimer, the term of this patent is extended or adjusted under 35 U.S.C. 154(b) by 0 days.

(21) Appl. No.: 17/408,682

(22) Filed: Aug. 23, 2021

(65) Prior Publication Data

US 2022/0065415 A1 Mar. 3, 2022

Related U.S. Application Data

(63) Continuation of application No. 17/145,703, filed on Jan. 11, 2021, now Pat. No. 11,112,079.
(Continued)

(51) Int. Cl.
*F21S 10/04* (2006.01)
*F21S 10/00* (2006.01)
(Continued)

(52) U.S. Cl.
CPC .......... *F21S 10/043* (2013.01); *F21S 10/002* (2013.01); *F21V 9/30* (2018.02); *F21Y 2115/10* (2016.08)

(58) Field of Classification Search
CPC .......... F21V 9/30; F21S 10/043; F21S 10/002
See application file for complete search history.

(56) References Cited

U.S. PATENT DOCUMENTS 6,966,665 B2 11/2005 Limburg
7,670,035 B2 3/2010 Tsai
(Continued)

FOREIGN PATENT DOCUMENTS

CA 2937685 A1 2/2015
CN 2932067 Y 8/2007
(Continued)

OTHER PUBLICATIONS

European Patent Office, Communication with extended European search report, in Application No. 21150740.5, dated Oct. 1, 2021 (5 pages).
(Continued)

*Primary Examiner* — Arman B Fallahkhair
(74) *Attorney, Agent, or Firm* — DENTONS Durham Jones Pinegar

(57) ABSTRACT

A flameless candle includes a candle body, a light source, and a flame element. The candle body includes an inner region and an upper surface including an aperture. The light source is energized and de-energized selectively to control whether or not a light is emitted. The light emitted by the light source is emitted towards the interior region of the flame element, such that it passes through the interior region and onto the interior surface. The flame element is at least partially transparent or translucent, such that it permits the light to propagate through the flame element and outwardly from the exterior surface. While the light is emitted, the flame element moves with respect to non-moving portions of the candle body. While the light is emitted, at least a portion of the flame element extends through the aperture in the upper surface.

19 Claims, 25 Drawing Sheets

Related U.S. Application Data

(60) Provisional application No. 62/959,028, filed on Jan. 9, 2020.

(51) Int. Cl.
*F21V 9/30* (2018.01)
*F21Y 115/10* (2016.01)

(56) References Cited

U.S. PATENT DOCUMENTS

| | | | | |
|---|---|---|---|---|
| 9,574,748 | B2 | 2/2017 | Dong | |
| 9,810,388 | B1 | 11/2017 | Li | |
| 10,161,584 | B2 | 12/2018 | Patton | |
| 10,215,353 | B2 * | 2/2019 | Thompson | F21S 6/001 |
| 10,794,556 | B2 | 10/2020 | Li | |
| 2014/0211499 | A1 | 7/2014 | Fong | |
| 2014/0313694 | A1 | 10/2014 | Patton | |
| 2015/0204530 | A1 | 7/2015 | Lee | |
| 2016/0109083 | A1 | 4/2016 | Li | |
| 2017/0130918 | A1 | 5/2017 | Li | |
| 2020/0412281 | A1 | 12/2020 | Li | |

FOREIGN PATENT DOCUMENTS

| | | | |
|---|---|---|---|
| CN | 101918755 | A | 12/2010 |
| CN | 202791782 | U | 3/2013 |
| CN | 203784814 | U | 8/2014 |
| CN | 204005710 | U | 12/2014 |
| CN | 105114906 | A | 12/2015 |
| CN | 106482067 | A | 3/2017 |
| CN | 104903643 | B | 1/2018 |
| CN | 207849235 | U | 9/2018 |
| CN | 109708065 | A | 5/2019 |
| CN | 209415330 | U | 9/2019 |
| CN | 110645538 | A | 1/2020 |
| CN | 107543113 | B | 7/2020 |
| CN | 211040818 | U | 7/2020 |
| GB | 2564783 | B | 7/2019 |
| IN | 208606101 | U | 3/2019 |
| WO | 2014062831 | A2 | 4/2014 |
| WO | 2014116541 | A1 | 7/2014 |
| WO | 2018187994 | A1 | 10/2018 |

OTHER PUBLICATIONS

Canadian Patent Office, Examiner Requisition in Application No. 3,105,766 dated May 10, 2022 (5 pages).

European Patent Office, Communication with extended European search report, in Application No. 21150740.5, dated Apr. 6, 2021 (7 pages).

* cited by examiner

FLAMELESS CANDLE WITH FLOATING FLAME ELEMENT

CROSS REFERENCE TO RELATED APPLICATIONS

The present application is a continuation of U.S. application Ser. No. 17/145,703, filed Jan. 11, 2021, which claims priority to and the benefit of U.S. Provisional Application No. 62/959,028, filed on Jan. 9, 2020, the entireties of which are herein incorporated by reference.

BACKGROUND

Generally, this application relates to electronic flameless candles. Such a flameless candle includes one that simulates a flickering effect on an artificial flame element that is viewable to an observer.

SUMMARY

According to certain techniques described herein, a flameless candle includes a candle body, a light source, and a flame element. The candle body includes an inner region and an upper surface including an aperture. The light source is energized and de-energized selectively to control whether or not a light is emitted. The light source may be located in the inner region of the candle body. The flame element has an interior region, an interior surface, and an exterior surface. The light emitted by the light source is emitted towards the interior region of the flame element, such that it passes through the interior region and onto the interior surface. The flame element is at least partially transparent or translucent, such that it permits the light to propagate through the flame element and outwardly from the exterior surface. The flame element may have at least one ridge on the interior surface and/or the exterior surface. Such ridge(s) distort the light. While the light is emitted, the flame element moves with respect to non-moving portions of the candle body.

The flame element may move by floating on a fluid. Such a fluid may be a liquid or forced air. Also during operation while the light is emitted, at least a portion of the flame element extends through the aperture in the upper surface. When the light is not emitted, a smaller portion or no portion of the flame element may extend through the aperture.

If the fluid is forced air, the candle may include a fan that forces the air towards the flame element during operation of the candle. A deflector may be employed, where the deflector includes at least one obliquely-oriented portion (i.e., not perpendicular or parallel to the primary axis of the candle). The deflector induces turbulence in the forced air before the air impinges on the flame element. The candle may include an airflow director with a hollow region. The flame element may rise through the hollow region after the fan is turned on. When the flame element reaches a predetermined height (either inside or outside of the airflow director), the flame element stops rising and begins hovering. It should be understood that hovering may cover activity when the flame element momentarily rises and falls. In other words, hovering as used herein does not imply that the flame element has a perfectly constant altitude during operation of the candle. The flame element may begin hovering at the predetermined elevation based on the positioning of at least one air recycling feature in the airflow director.

Instead of air, the fluid may be a liquid. The flameless candle may have a component that perturbs the liquid while the light is emitted. This causes the flame element to move.

The candle may have a first magnet coupled to the flame element and a second magnet configured to repel the first magnet, such that the flame element levitates above the second magnet.

The candle may also have a light pipe that pipes light from the light source at least partially in an upward direction towards the flame element. According to some techniques, the light source moves with respect to non-moving portions of the candle body while the light is emitted.

According to certain techniques described herein, a flameless candle has a candle body, a light source, a fan, and a flame element. The candle body has an inner region and an upper surface with an aperture. The light source selectively emits a light when it is energized or de-energized. The fan forces air upwardly while the light is being emitted. The flame element receives the light, for example, on an interior or exterior surface of the flame element. The flame element also receives the air. While the light is being emitted, the flame element floats on the air. The flame element is uncoupled from any other portion of the flameless candle while the light is emitted. The candle may further include a deflector including at least one obliquely-oriented portion, wherein the deflector induces turbulence in the air before the air is received by the flame element. The candle may further include an airflow director including a hollow region, wherein the flame element rises through at least a portion of the hollow region of the airflow director after the fan is turned ON such that when the flame element reaches a predetermined elevation, the flame element ceases rising and begins hovering. The predetermined elevation may be determined by at least one air recycling feature in the airflow director, such as a notch or hole. An upper contour of the airflow director may include a chamfered surface.

BRIEF DESCRIPTION OF SEVERAL VIEWS OF THE DRAWINGS

FIG. 3B shows physical components and air currents as indicated by certain arrows.

Figure 1A:
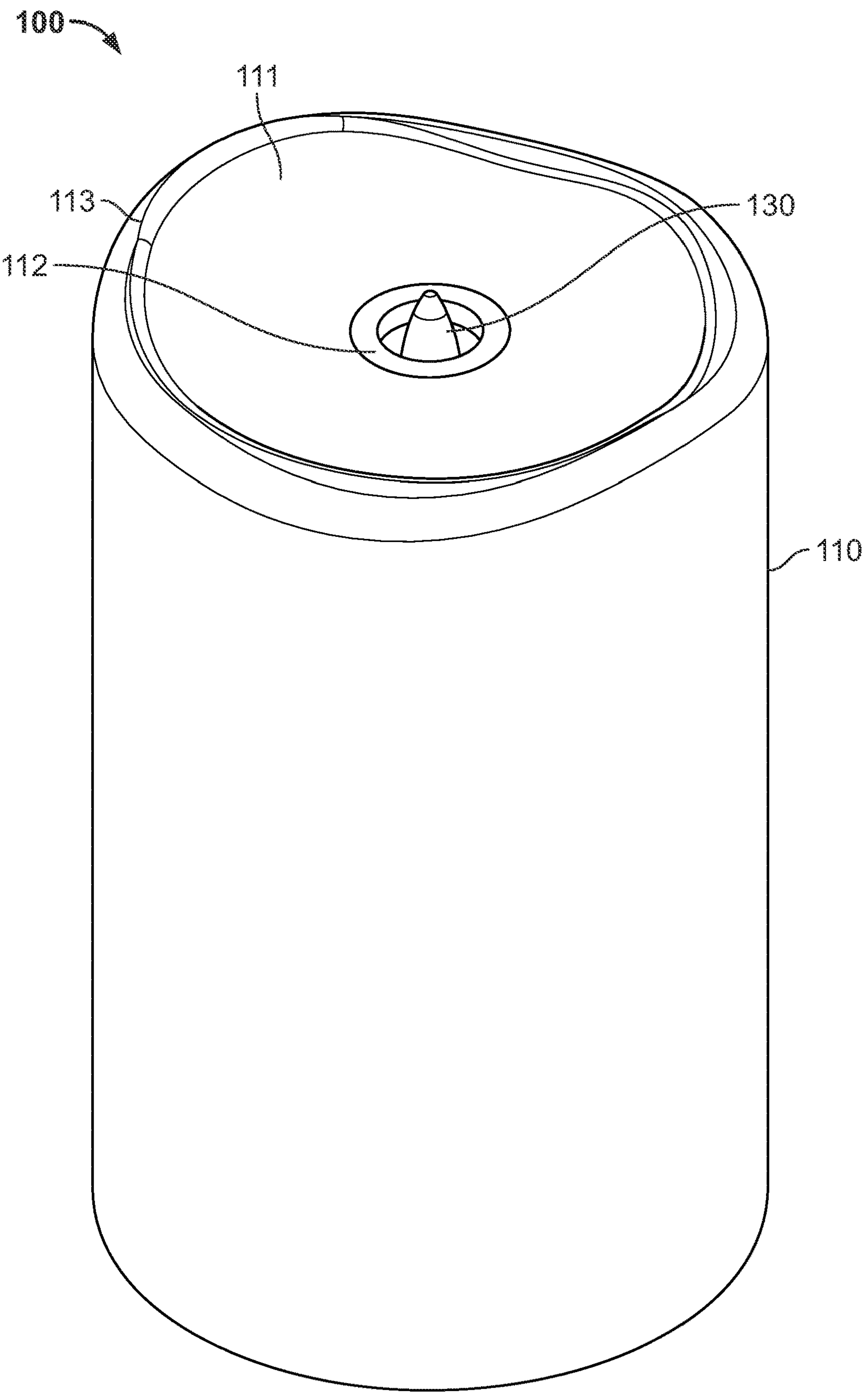
FIGS. 1A and 1B illustrate perspective views of a flameless candle when the flameless candle is OFF and ON, respectively, according to techniques disclosed herein. When the flameless candle is ON, the flame element floats on air.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

DETAILED DESCRIPTION

Techniques described herein provide a more realistic flame movement over certain existing flameless candles. Many such existing candles employ pivots or magnets with an artificial flame element to reproduce the look of a real candle flame. This construction may limit the degrees of movement of the flame element. Techniques described herein allow the flame element to move in up to five degrees of movement (or more) during operation of the flameless candle. Such movement capabilities may more faithfully imitate the motion of a natural candle flame. Consider that real flames are fluids and, as such, they behave according to the laws of fluid dynamics. Certain techniques described herein also employ fluids to simulate a true candle flame, and may improve the effect of the illusion.

The techniques described herein provide for a candle that has a flame element that floats on a fluid (either air or liquid) during operation. Further, the techniques described herein also provide for a candle that has a moving flame element that receives light in an interior region and emits it outwardly from its exterior surface.

Figure 1B:
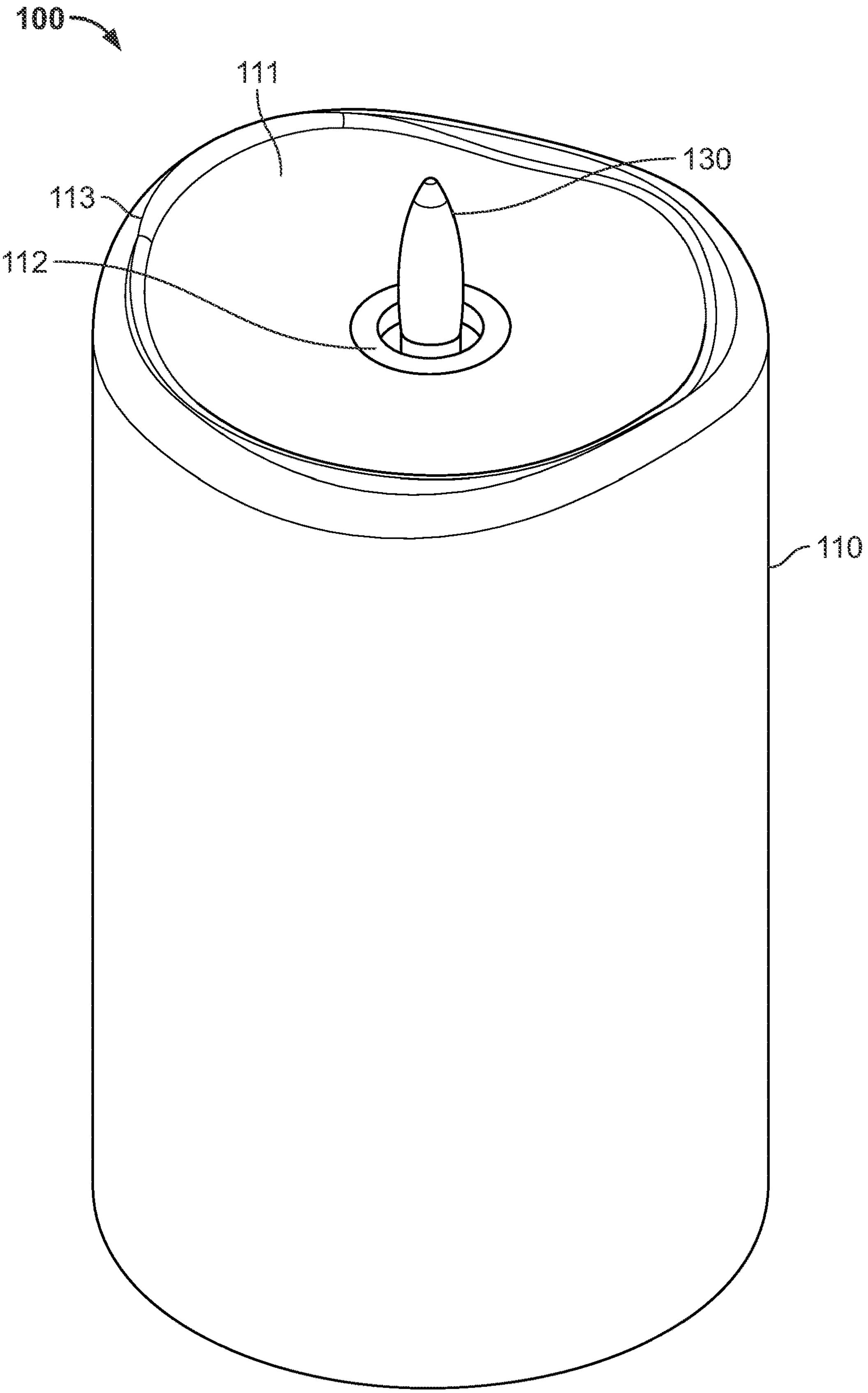

FIGS. 1A and 1B illustrate perspective views of a flameless candle 100 in OFF and ON configurations, respectively. The flameless candle 100 simulates a conventional candle (i.e., a candle that has a true flame). The flameless candle 100 includes an imitation flame element 130 that, when the candle 100 is in the OFF configuration as shown in FIG. 1A, is retracted into the interior of the candle 100, such that the entirety of the flame element 130 is not visible to an observer standing to the side of the candle 100. It is possible that only a portion of the flame element 130 is viewable in the OFF configuration or that no portion is viewable at all. When the candle 100 is in the ON configuration as shown in FIG. 1B, the flame element 130 extends upwardly such that the viewer can see all or most of the portion of the flame element 130 that simulates a true flame. The flame element 130 rises and falls to form the ON and OFF configurations. The rising and falling of the flame element 130 is caused by selectively blowing air onto the flame element 130 or a component coupled to the flame element 130.

The flameless candle 100 includes a candle body 110. The candle body 110 has an outer surface visible to a viewer. The outer surface includes a lateral (or circumferential) surface wrapping around a primary axis of the flameless candle 100, a lower surface underneath the flameless candle 100, and an upper surface 111 of the flameless candle 100. The upper surface 111 includes an aperture 112. The aperture 112 may be substantially in the center of the upper surface 111. For example, the primary axis of the flameless candle 100 may pass through the aperture 112. The aperture 112 may also be offset from the center of the upper surface 111. The upper surface 111 may be flat or may have another geometric shape, such as one with a concave recess as depicted. The flameless candle 100 may have a rim 113 from which the upper surface 111 extends at least partially downwardly and inwardly towards the aperture 112. According to certain configurations, the upper surface 111 may cover an upper surface of the rim 113—i.e., portions of outer surface of the rim 113 may be co-extensive with the upper surface 111. The candle body 110 also has an inner region within which one or more of the other components of the flameless candle 100 are housed—either partially or in full. The inner region may be substantially hollow.

The candle body 110 may house the power source 180 (e.g., AA or C batteries or rechargeable batteries), or the power source 180 may be located outside of the candle body 110 (e.g., a transformer electrically connected to the electrical systems of the candle 100).

Figure 2:
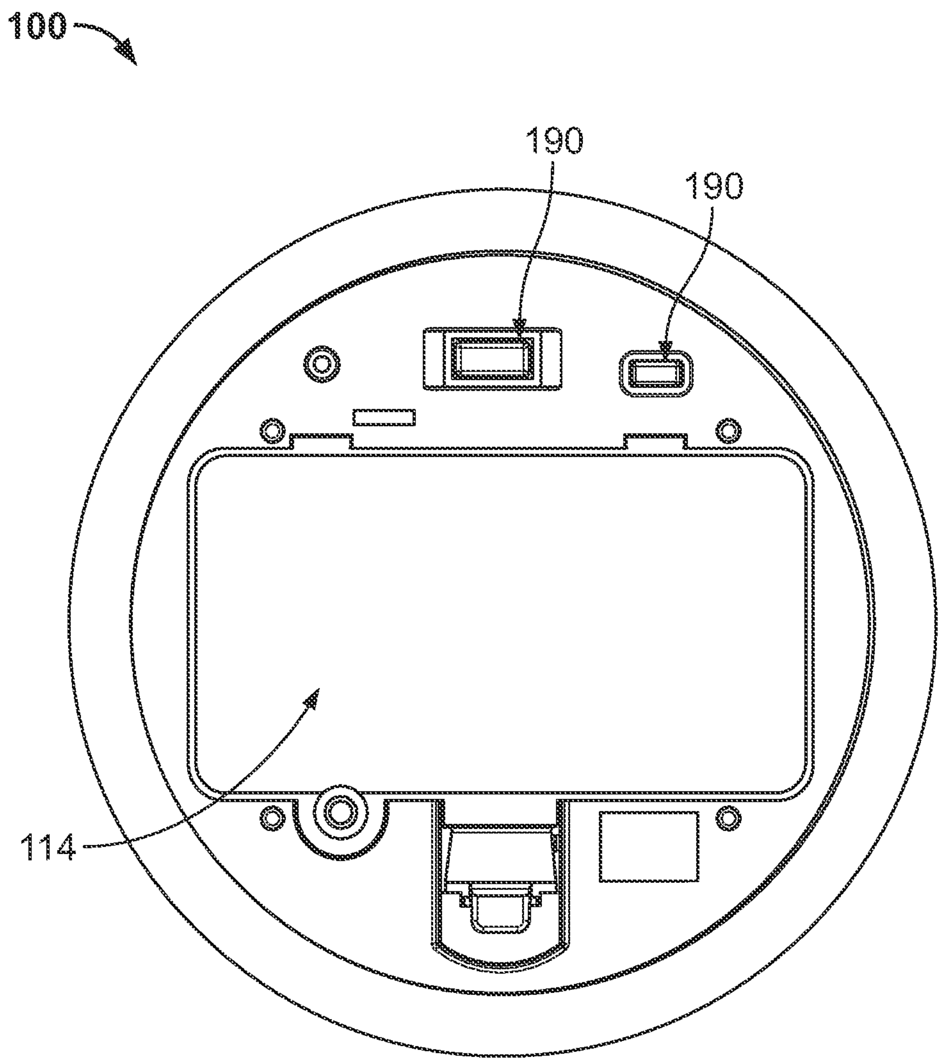
FIG. 2 illustrates a bottom view of the flameless candle shown in FIGS. 1A and 1B, according to techniques disclosed herein.

The flameless candle 100 may further include an underside, as depicted in FIG. 2. The underside may include a battery door 114 and user interface elements 190. The battery door 114 can be opened to remove/place batteries into the flameless candle 100. The user interface elements 190 allow a user to interact with the candle 100 to control one or more of its operations.

Figure 3A:
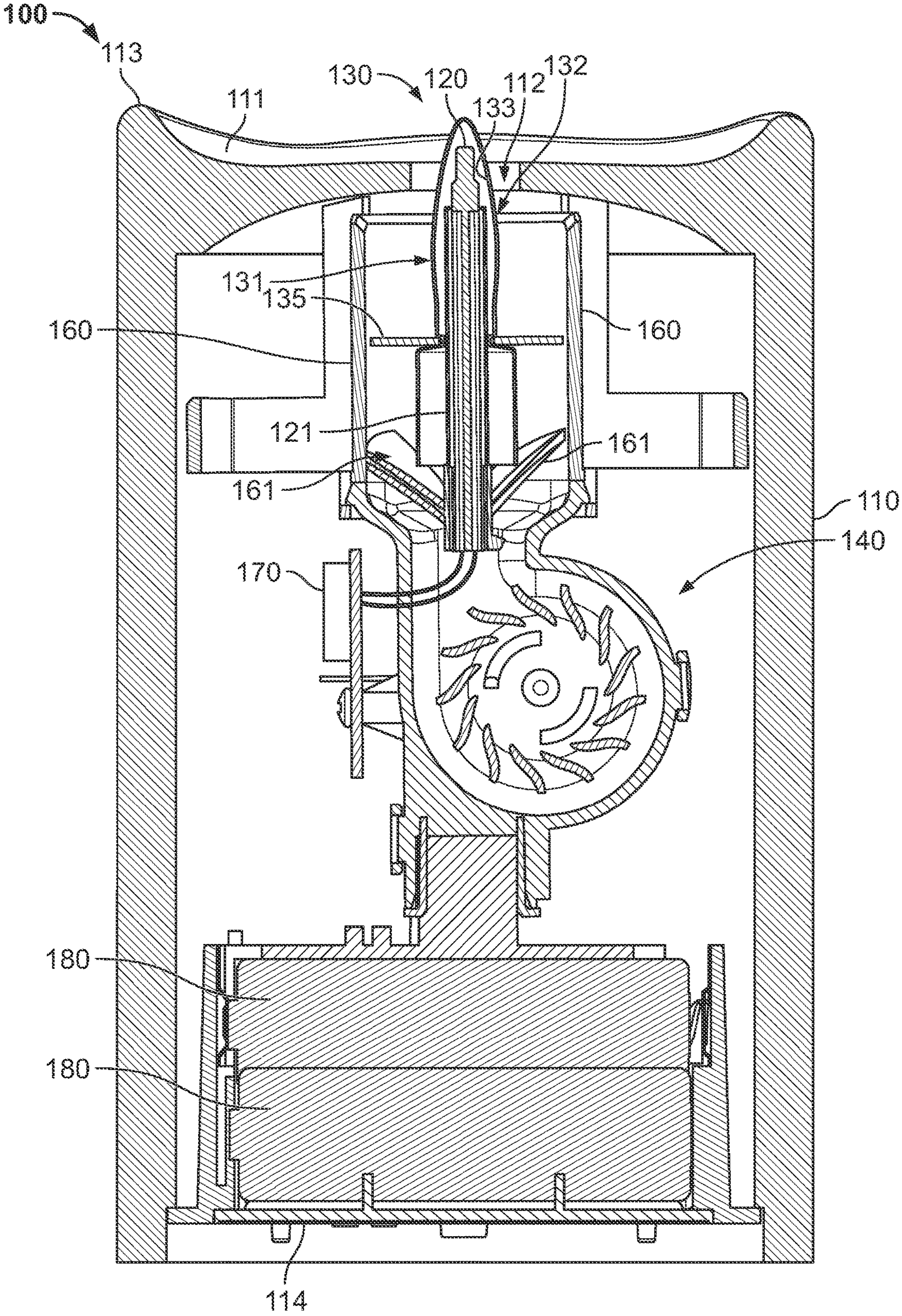
FIG. 3A illustrates a cross-sectional view of the flameless candle of FIG. 1A, according to techniques disclosed herein.
Figure 3B:
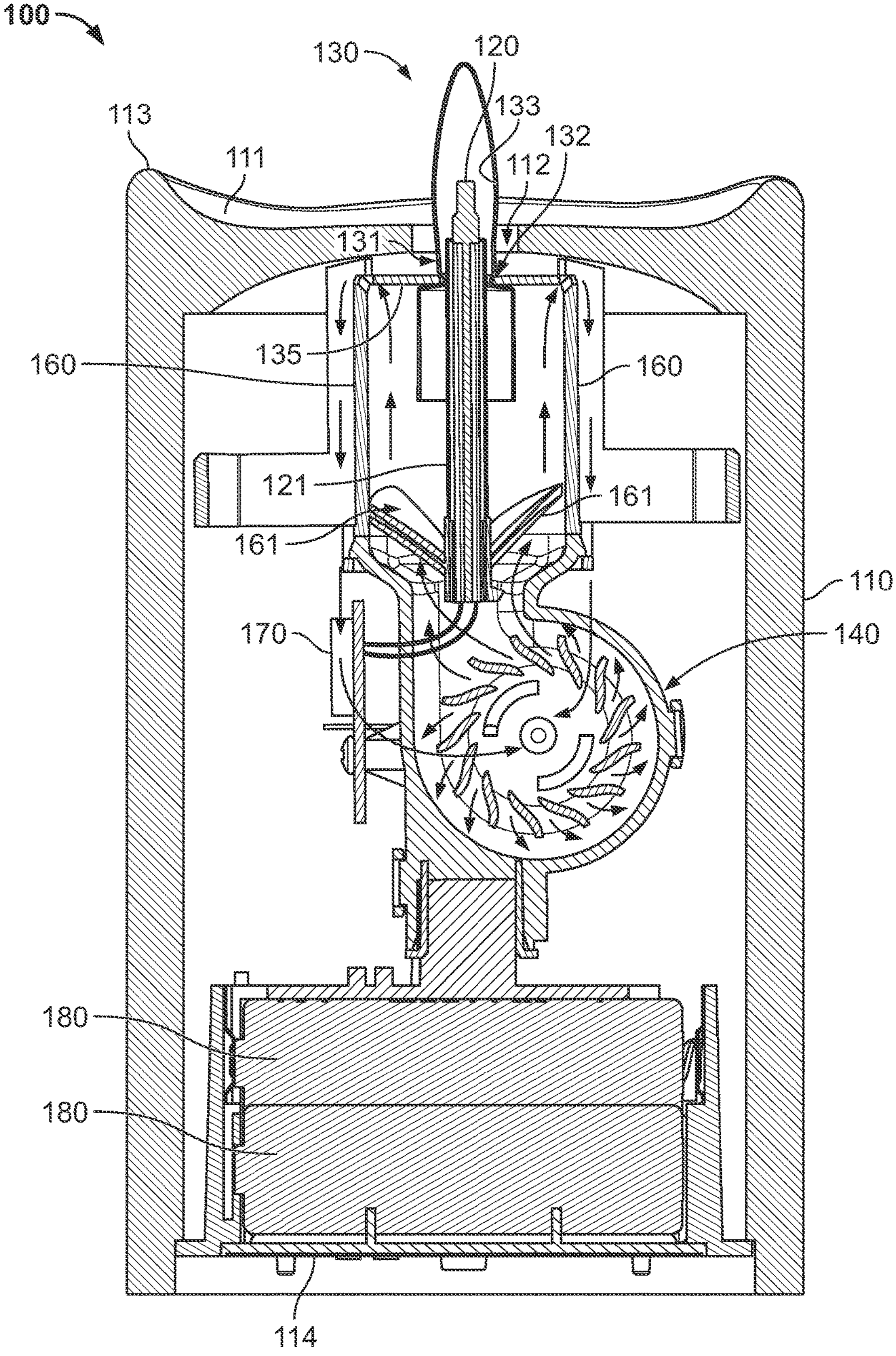
FIG. 3B illustrates a cross-sectional view of the flameless candle of FIG. 1B, according to techniques disclosed herein.

FIG. 3A illustrates a cross-sectional view of the candle 100 of FIG. 1A (i.e., the candle 100 in the OFF configuration). When the candle 100 is in the OFF configuration, there is no air flow (or a reduced air flow) within the hollow interior. FIG. 3B illustrates a cross-sectional view of the candle 100 of FIG. 1B (i.e., the candle 100 in the ON configuration). When the candle is in the ON configuration, a fan 140 forces air through the interior of the candle. FIG. 3B illustrates this air flow (arrows) within the candle 100, in addition to the physical components.

As shown in the embodiment of FIGS. 3A and 3B, the flameless candle 100 includes a candle body 110, a light source 120, a sheath 121, a flame element 130, a fan 140, an airflow director 160, circuitry 170, and a power source 180. The user interface 190 is depicted in FIG. 2. The flameless candle 100 may also include a remote control (not shown) and receiver on the candle 100 (e.g., infrared receiver or other sort of antenna) to remotely control the operations described herein. The flameless candle 100 may also include other components not depicted, such as sensors, indicators, or speakers. The functions of such components are described below.

The candle 100 operates when a user interacts with the user interface 190 or remote control. The user interface 190 may include one or more actuators. The actuators may allow the user to turn the candle 100 ON or OFF. Other features potentially controllable through the actuators include controlling the speed of the fan 140, the intensity or character of the light emitted by the light source 120, the implementation of a timer, the actions taken when sensor inputs are sensed, and/or other features. Such features and functionality are described herein and need not be repeated here. User interaction may also be effectuated through a remote control in combination with or in lieu of the user interface 190.

The user causes the fan 140 and/or light source 120 to turn ON or OFF. When the fan 140 turns ON, air is forced onto the flame element 130 or a component attached thereto. This causes the flame element 130 to rise and extend through the aperture 112 of the upper surface 111. Light is projected from the light source 120 onto an interior surface 133 of the flame element 130, such that it projects through the flame element 130 and outwardly to the observer's eye. Subsequently, the user can turn both the fan 140 and light source 120 OFF, thereby causing the flame element 130 to fall down such that the candle 100 no longer appears to have a visible flame, and the illusion of a candle ceases.

The light source 120 may include an LED or incandescent device. The light source 120 may also include circuitry that influences the character of the emitted light. Such circuitry may include circuitry embedded in an LED package (for example, an ASIC) and/or external circuitry, such as circuitry 170 discussed below. According to some techniques, the circuitry includes a processor that influences or controls the character of the light emitted by the light source 120. Such a processor executes machine-readable instructions stored in memory to operate the light source 120 as described herein.

The light source 120 may emit light having different colors or only a single color. The associated circuitry of the light source 120 may cause different colors of light to be emitted simultaneously and/or at different times. Light may be emitted that varies in intensity over time due to operations of the associated circuitry. For example, the light source 120 may emit a light that emulates a true, flickering flame. Alternatively or in addition, the light source 120 may emit light with a constant intensity—possibly at controllable or selectable intensity levels.

The light source 120 may include one or more light emitting components (e.g., multiple LED packages in different locations and/or multiple dies in a single LED package). For example, the light source 120 may include a plurality of light-emitting components, such as multiple LED packages or multiple dies within a single LED package. If the light-emitting components emit light having different colors, they can be controlled to achieve an overall light output having a selected color. The intensities of the outputs of the light-emitting components can be varied to arrive at different selected colors.

When the light source 120 includes a plurality of light-emitting components, the different light-emitting components may be oriented such that the emitted light beams impinge on different locations of the interior surface 133 of flame element 130. In such a configuration, the intensities and/or colors of the light beams may vary over time in a distinct manner such that movement of a true flame is simulated to a viewer looking at the flame element 130.

When multiple light-emitting components are employed, the associated circuitry may independently control one or more different aspects of the light projected by the different light-emitting components (e.g., two components). For example, the circuitry may be capable of separately controlling the intensity and/or color for each light-emitting component. The intensities of each light-emitting component may be adjusted by varying a pulse-code modulated signal or a pulse-width modulated signal provided to the given light-emitting component. The associated circuitry may cause each light-emitting component to emit light with different sequences of intensities over time. Such sequences may include random sequences, semi-random sequences, or predetermined sequences. A sequence may include a repeating loop (for example, a 5-10 second loop). Such sequences may include frequencies that are out of phase from each other. For example, one predetermined sequence may be applied to a first light-emitting component, and the same predetermined sequence may be applied to a second light-emitting component, but out of phase. As another example, a first predetermined sequence may be applied to a first light-emitting component and a second predetermined sequence may be synchronously applied to a second light-emitting component. The second predetermined sequence may result from filtering or adjusting the first predetermined sequence. Such filtering may include high-pass and low-pass filtering, and such adjusting may include attenuating the amplitudes of the first predetermined sequence.

Sequences may be dynamically influenced by other factors or inputs. For example, an output signal from a light sensor (not shown) could be received by the associated circuitry, which may, in turn, adjust the intensity levels in sequences according to the light sensor output signal (for example, boost the intensities under higher light). As another example, an output signal from a sound sensor (not shown) could be received by the associated circuitry, which may, in turn, adjust the intensity levels in sequences according to the sound sensor output signal (for example, adjust the frequency of the intensity changes in response to the character of received sound).

According to one example, it may be possible to provide distinct circuitry for each light-emitting component. Each distinct circuitry may be integrated into an epoxy case that houses a light-emitting diode. The two distinct circuitries may be synchronized or coordinated through a signal communicated between the distinct circuitries.

The light source 120 may also include components that alter the shape, color, or intensity of the light emitted directly out of light-emitting component(s). Such altering components may include one or more lenses, collimators, filters, and/or other optics. Such optics may have a static position and/or may move while the light is emitted to cause a time-varying intensity (e.g., an effect that emulates flickering of a true candle flame).

As will be further discussed, the light source 120 may be housed in the inner region of the candle body 110 or may be outside. If the light source 120 is housed in the inner region of the candle body 110, it may emit light through the aperture 112. The light source 120 may alternatively be positioned above the aperture 112 in the upper surface 111, but may be encompassed by the flame element 130 as depicted in FIGS. 3A and 3B. The light source 120 may project light into a light pipe (not shown) that routes the light from the light source 120 to a suitable location. Such a light pipe may include a material such as optical fiber (e.g., fibers formed from glass or plastic) or acrylic. The use of a light pipe can allow the light source 120 to be positioned at any of a variety of suitable locations. The light pipe may terminate above or below the aperture 112 in the upper surface 111. The light pipe may terminate within or below the flame element 130, such that light is internally projected from the flame element 130.

A sheath 121 may surround all or part of the lateral portions of the light source 120. The sheath 121 may provide a barrier against wind. The sheath 121 may also provide support for the light source 120. As shown, the sheath 121 surrounds the leads of the light source 120 (which is depicted as an LED). The sheath 121 may provide a feature on which the light source 120 is seated.

The flame element 130 may have a portion 131 that resembles the shape of a candle flame (i.e., a flame shape). The flame element 130 may also include other portions aside from the flame-shaped portion 131 as further described. The flame-shaped portion 131 may be shaped and positioned to receive light emitted from the light source 120 and/or light pipe 125. At least part of the flame-shaped portion 131 extends upwardly from the upper surface 111 or aperture 112. For example, the flame-shaped portion 131 (or a part thereof) may extend through the aperture 112 while light is emitted, such that a viewer can view the flame-shaped portion 131.

The flame-shaped portion 131 may receive light on an exterior surface 132 or an interior surface 133 of the flame element 130. In the event that the flame element 130 receives light on the interior surface 133, it includes an interior region through which the light first passes. In this configuration, the flame-shaped portion 131 may be transparent or translucent. The light may be directed towards the interior region of the flame element 130. The interior region of the flame element 130 may be at least partially (or entirely) hollow. Light may pass through the interior region, onto an interior surface 133 of the flame element 130. The flame element 130 may then allow the light to propagate through the flame element 130 and outwardly from the exterior surface 132.

The interior region of the flame element 130 may include a light pipe that routes light through the interior region to the exterior surface 132. Portions of the flame element 130 may act as a light pipe, such that light can be transferred from underneath the flame element 130 (or underneath a portion of the flame element 130) to a selected location on the surface of the flame element 130.

In the event that the flame element 130 receives light on the exterior surface 132, the flame element 130 may or may not have a hollow interior region. In this configuration, the flame-shaped portion 131 may be substantially opaque or translucent.

Figure 4:
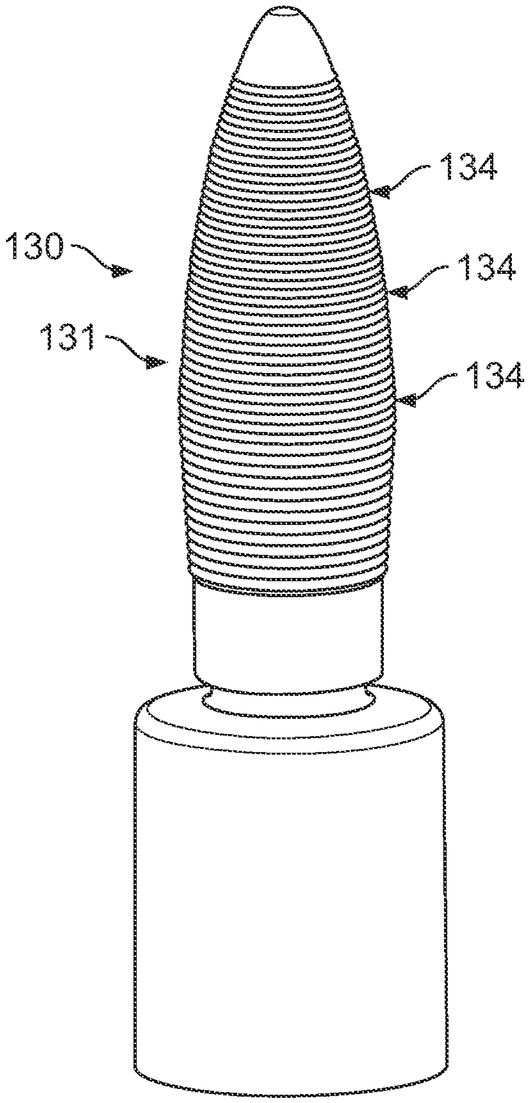
FIG. 4 illustrates a perspective view of a flame element, according to techniques disclosed herein.

As depicted in FIG. 4, the flame element 130 may include one or more features 134 on the interior surface and/or exterior surface of the flame element 130. Such features may include ridges, ribs, or protrusions/recesses. As shown in FIG. 4, the features 134 are ribs on the exterior surface of the flame element 130. The features 134 are shaped and positioned to enhance the illusion of a true flame by distorting the light as desired. For example, when light travels through the flame-shaped portion 131, the features 134 may distort the light such that it appears to be more diffused. The features 134 may have a sawtooth, arcuate, and/or Fresnel lens form(s). The features 134 may be vertically and/or horizontally oriented. The features 134 could be a mix of these forms or other forms. The features 134 may be embossed, engraved, or laid over the flame element 130. The flame element 130 and/or features 134 may include pigment to produce a desired light effect.

According to one technique, phosphor can be applied to the flame element 130. A blue LED can emit light onto the phosphor, thereby creating a white color. Phosphor paint could be injected in the flame element 130 during manufacturing, or painted inside or outside the flame element 130. According to a technique, only a portion of the flame element 130 may be coated or infused with phosphor. For example, an upper region of the flame element 130 may have the phosphor while a lower region does not. This may cause an illusion of a real candle flame with a blue region in the lower area and a white region in the upper area of the flame element 130.

Figure 3C:
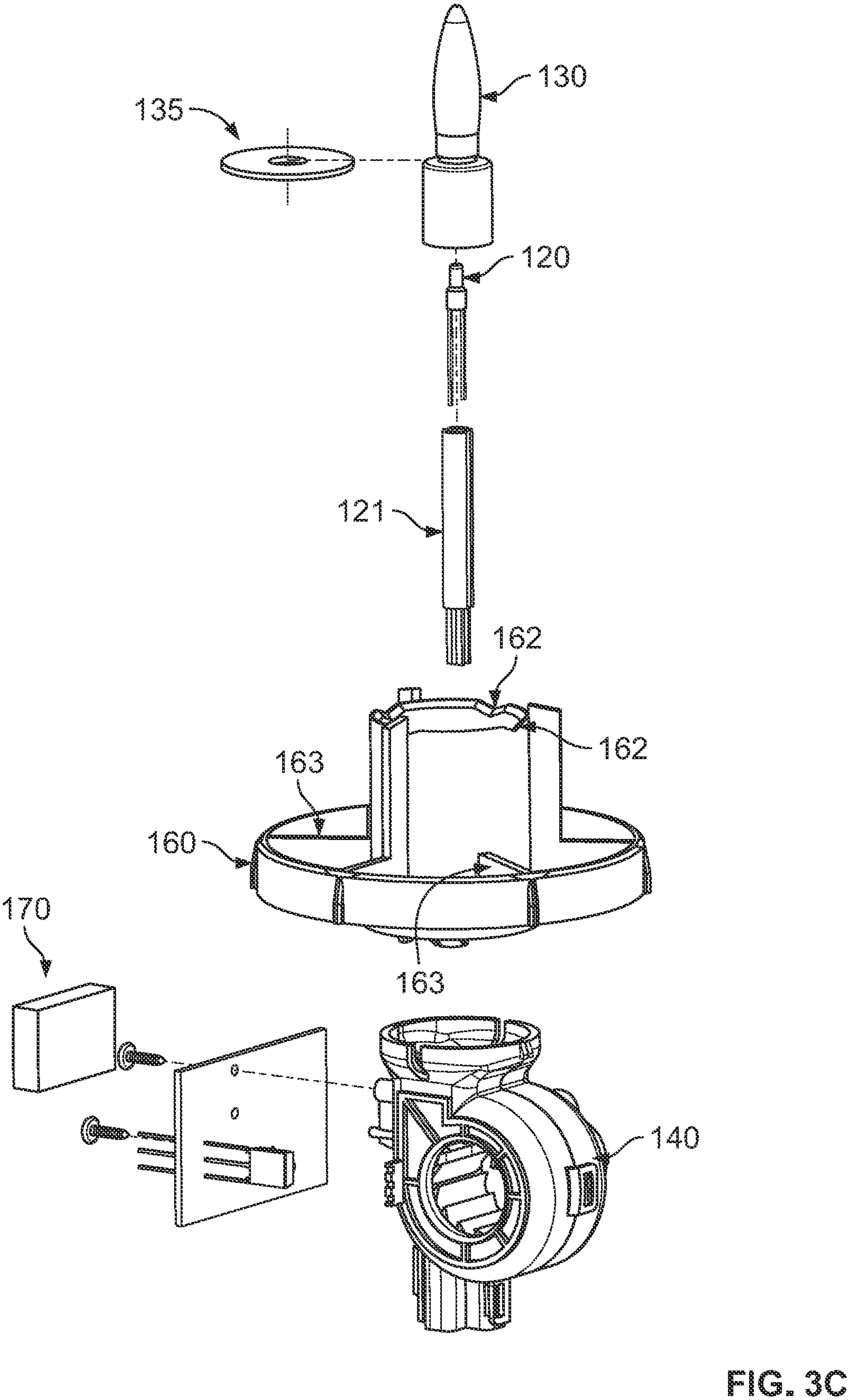
FIG. 3C illustrates an exploded view of a portion of the flameless candle of FIGS. 1A and 1B, including the flame element and fan, according to techniques disclosed herein.

The flame element 130 may further include an extension 135. The extension 135 may be integrated with, attached to, or connected to other portion(s) of the flame element 130. The extension 135 may extend at least in a horizontal dimension away from the other portions of the flame element 130. The extension 135 may have a toroidal shape, and the center aperture of the extension 135 may fit around the flame element 130 (and possibly into a recess in the flame element 130) as shown, for example, in FIGS. 3A, 3B, and 3C. According to certain techniques, the extension 135 may serve to receive air to facilitate the flame element 130 to float on air by receiving the air.

The flame element 130 may move while light is emitted by the light source 120. The flame element 130 may also be uncoupled from all other non-moving portions of the candle 100 while light is emitted. The flame element 130 may move in multiple degrees of freedom (for example, pitch, roll, yaw, up, down, backward, and/or forward, or any subset thereof) while the light is emitted. Such movement of the flame-shaped portion 131 may resemble movement of a real candle flame.

The flame element 130 and/or the extension 135 receive forced air from a fan 140. The outlet of the fan 140 is positioned such that the fan 140 blows air upwardly onto the flame element 130 and/or extension 135. In any event, variations in air pressure generated by the fan 140 or otherwise cause the flame element 130 to rise upwardly during operation of the candle 100. The fan 140 may be a centrifugal fan as shown, or it may be another type of fan, such as an axial fan or a cross-flow fan. Exemplary airflow in the candle 100 is depicted in FIG. 3B with arrows without enumeration. As depicted, the outlet of the fan 140 forces air upwardly through an airflow director 160, which will be discussed below. As further depicted, after passing through the airflow director 160, the forced air is circulated through the laterally-located intake(s) of the fan 140. The fan 140 receives electrical power from the power source and may be controlled by circuitry 170. The fan 140 may operate in conjunction with the light source 120 or independently. According to one technique, the fan 140 and the light source 120 are switched ON/OFF together at substantially the same time. In this manner, when the fan 140 is ON and the flame element 130 floats, the light source 120 emits light. Conversely, when the fan 140 is OFF and the flame element 130 stops floating, the light source 120 does not emit light.

Like the light source 120, the fan 140 may provide an uneven output over time. For example, the speed of the fan 140 may vary such that the pressure of the air applied to the flame element 130 and/or extension 135 changes over time during operation. This unevenness causes the flame element 130 to rise and fall (and possibly move in other dimensions or degrees of freedom as discussed) to enhance the illusion of a true candle flame (especially the illusion of air currents interacting with the true flame). For example, the fan 140 may momentarily stop, thereby allowing the flame element 130 to drop down, thereby resembling a real flame on a candle (under certain conditions). Similarly, the fan 140 may cause the flame element 130 to momentarily rise up as would a real flame. Furthermore, the fan 140 may operate at variable speeds, thereby controlling the rate at which the flame element 130 moves up and down. Such variation could be performed in a coordinated manner with varying the output of the light source 120. Alternatively, varying the fan 140 speed could be performed independently of the light source 120. For example, the fan 140 may vary speed but the light source 120 may maintain a constant output. According to one technique, the light source 120 provides a flickering light output at a given time and, coextensively, the speed of the fan 140 is varied to enhance the illusion of a flickering candle. The speeds of the fan 140 and output of the light source 120 can also be constant but periodically vary (either together or independently). According to such a technique, the appearance of the light emitted from the candle 100 may periodically or aperiodically vary during constant operation of the candle 100, whereby the light outputted by the light source 120 and/or position of the flame element 130 is constant during one phase and varies during another.

The fan 140 and/or the light source 120 may operate in response to a timer, such that they automatically turn OFF after a predetermined period of time. The fan 140 and/or the light source 120 may also automatically turn ON after a predetermined period of time. For example, once activated, the fan 140 and/or the light source 120 may automatically turn OFF after 5 hours. Then, 19 hours later, the fan 140 and/or the light source 120 may automatically turn ON. This automatic switching may continue as a cycle. The timer-based switching (cyclical or not) can be activated when a user turns the candle ON in a timer mode. The timer mode may be enabled or disabled by the user through the user interface or remote control.

The airflow director 160 includes a hollow interior region, which receives forced air from the outlet of the fan 140 at a lower area of the airflow director 160. As depicted in FIGS. 3A and 3B, the light source 120 and sheath 121 extend upwardly through the airflow director 160. As further shown, most clearly in FIG. 3A, the outer diameters of the flame element 130 and extension 135 along a horizontal plane are less than the inner diameter of the hollow interior region of the airflow director 160. In this way, the flame element 130 and/or extension 135 can travel along a vertical dimension (upwardly and downwardly) through at least a portion of the airflow director 160. The airflow director 160 may also include one or more deflectors 161 inside or below the hollow interior region. The deflectors 161 may be obliquely oriented or configured otherwise to induce turbulence or a non-laminar flow of the air outputted by the fan 140. In such a manner, the air reaching the flame element 130 and/or extension 135 can cause the flame element 130 to move in an irregular manner. Such irregular motion of the flame element 130 may provide an illusion of a true candle flame moving irregularly in space. Although not shown, the angle or position of the deflectors 161 may be adjustable manually or automatically to dynamically vary the degree of turbulence and the resulting degree of irregular motion of the flame element 130 during operation of the candle 100.

The airflow director 160 may also include one or more airflow recycling features 162, which are openings or notches in the wall that forms the hollow interior region. The design of the airflow recycling features 162 may control the elevation and/or movement of the flame element 130. As the flame element 130 and/or extension 135 rise through the hollow interior region, the air pressure may be substantially constant. When the flame element 130 and/or extension 135 emerges from the top of the hollow interior region, the air pressure suddenly drops. The airflow recycling features 162 can be positioned to control or influence the degree that the air pressure drops.

During the ON operation, the air flow might be exhausted by the airflow recycling features 162 and a gap formed between the sidewall of the airflow director 160 and the extension 135. According to one technique, the majority of air may be expelled by the airflow recycling features 162 and a smaller amount through the gap between the airflow director 160 and the extension 135.

The airflow recycling features 162 may also control or influence the elevation at which the flame element 130 floats. For example, as depicted in FIG. 3B, the airflow recycling features 162 allow the extension 135 to float at a height in which it is still at least partially inside of the hollow interior region. In this manner the lateral motion of the flame element 130 can be constrained because the lateral motion of the extension 135 is limited by the sidewall of the hollow interior region of the airflow director 160.

An upper surface or contour of the airflow director 160 may be chamfered to stabilize the air pressure applied to the flame element 130 and/or extension 135. The chamfered contour provides a tapered radius along the height of the surface, such that the lower region of the surface has a smaller radius than the upper region. As the flame element 130 and/or extension 135 travels up and down, the amount of air those components receive changes. In the lower region, relatively more pressure is applied. In the upper region, relatively less pressure is applied. This configuration may improve stability of the flame element 130 and/or extension 135. As those components travel upwardly, they receives less force, thereby allowing them to slow down. Eventually, the flame element 130 may reach a substantially stable height, such that the gravitational force and the force received from the forced air are offsetting.

The circuitry 170 may control some or all of the operations of the light source 120 and/or fan 140 as described herein. The circuitry 170 may also receive inputs from the various sensors, actuators in the user interface 190, and/or remote controls described herein. The circuitry 170 may include a processor that executes a set of computer-readable instructions stored in a non-volatile memory to achieve the functionality described herein.

FIGS. 5-22 illustrate embodiments that do not employ a fan to cause the flame element to float on air. Instead, these figures depict embodiments of flameless candles in which the flame element floats on a liquid or levitates due to magnetism. For the embodiments in which the flame element floats on a liquid, such a liquid could be water or oil (e.g., scented oil) or any other suitable liquid. The liquid could also be a gel or other type of semiliquid material that conducts mechanical forces in a suitable manner to promote the illusion of a true candle flame that moves in physical space. In these embodiments, the liquid is selectively perturbed to create motion. Various different mechanisms to perturb the liquid are described below. The motion in the liquid causes the floating flame element to move as well. The motion of the flame element may be irregular and may simulate a true candle flame. Light may be projected from within the flame element or onto an external surface of the flame element.

For the embodiments in which the flame element magnetically levitates, the flame element is coupled to a magnet. An opposing magnet is selectively positioned underneath the flame element magnet to cause levitation. In some embodiments, the opposing magnet may be an electromagnet. An additional electromagnet (aside from one used for levitation) may be used to perturb the floating magnet to cause the flame element to move in various additional ways.

Figure 5:
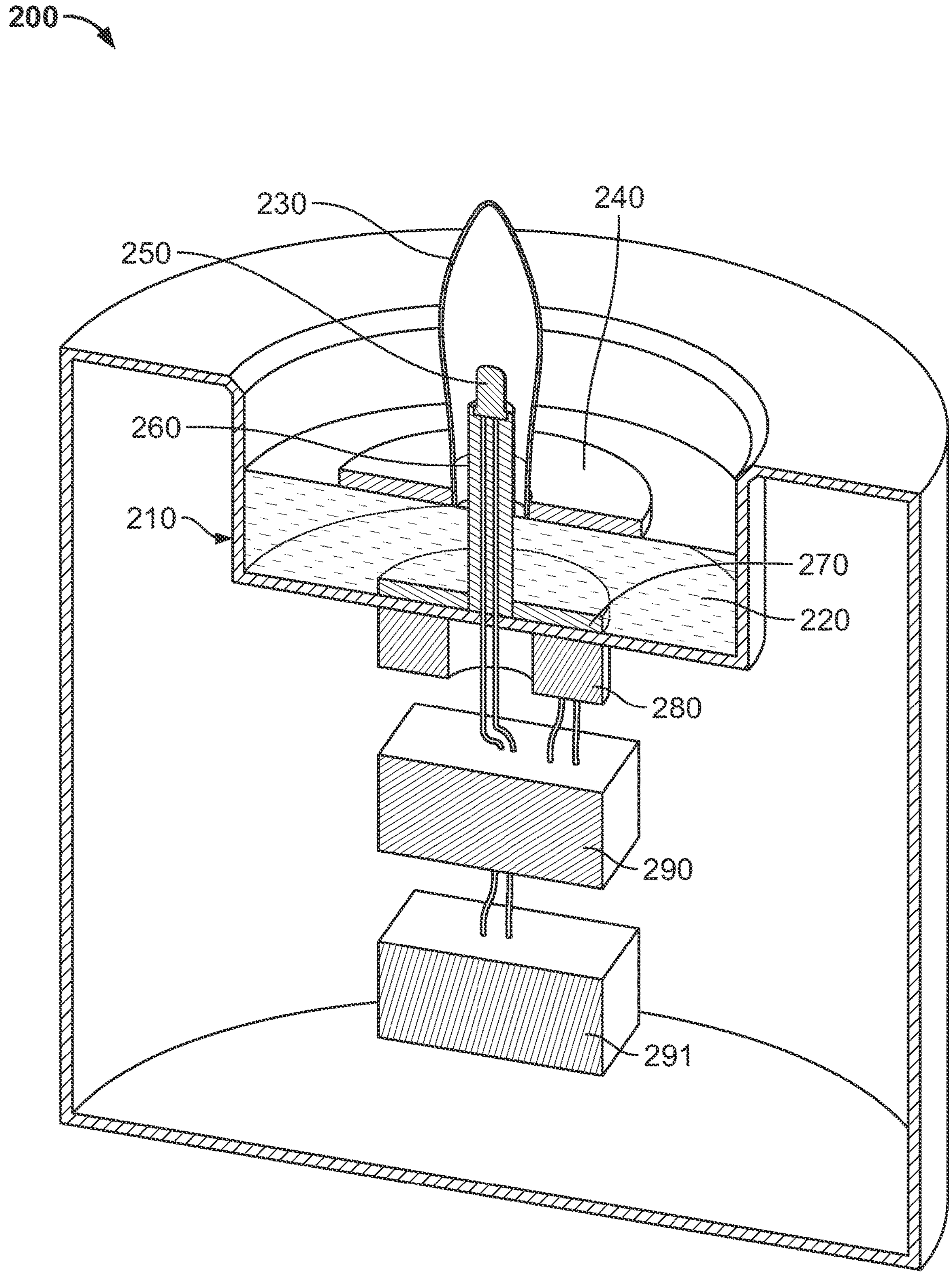
FIGS. 5, 6, 7, 8, 9, 10, 11, and 12 illustrate perspective views of different flameless candles that include a flame element that floats on a liquid, according to techniques disclosed herein.

FIG. 5 depicts an embodiment of a flameless candle 200 including a candle body 201, which houses circuitry 290 and a power source 291. The circuitry 290 receives power from the power source 291 and controls the electrical and mechanical operations of the candle 200. Circuitry 290 may be similar in many respects to circuitry 170 discussed in the context of FIGS. 3A-3C. Power source 291 may be similar in many respects to power source 180 discussed in the context of FIGS. 3A-3C. Although not shown, the candle 200 may have a user interface, remote control, various sensors, and/or other components and features discussed in the context of FIGS. 1-4. It is understood that features from different embodiments can be mixed according to design preferences. For example, features from fan-based, liquid-based, and levitation-based embodiments can be mixed and need not be repeated in full for each embodiment.

The candle body 201 includes a reservoir 210, which retains a liquid 220. A flame element 230 is coupled to a flotation component 240, which floats on the liquid 220. Alternatively, the flotation component 240 may be integrated with the flame element 230 (i.e., the flame element 230 by itself floats). To effectuate floating, the flame element

230 and/or flotation component 240 may include a material such as polypropylene, LDPE, MDPE, HDPE, or polychloroprene.

The flame element 230 may be similar to flame element 130. For example, the flame element 230 may have features, such as ridges, ribs, or protrusions/recesses, which can distort light emitted from the flame element 230 as desired. The flame element 230 includes a hollow interior region. A light source 250 (e.g., one such as light source 120) is positioned within the hollow interior region of the flame element 230, such that when light is emitted, it projects from within the flame element 230. The light source 250 is supported by a support 260, which extends upwardly from the lower surface of the reservoir 210. The support 260 (or the light source 250) may constrain the lateral motion of the flame element 230. The light source 250 includes conductors which extend upwardly through the lower surface of the reservoir 210 and through the support 260. In addition to providing mechanical support for the light source 250, the support 260 may serve to insulate the conductors from moisture. The conductors deliver electrical power to the light-emitting portion of the light source 250, and such power may be transmitted from circuitry 290.

Underneath the reservoir 210 is an electromagnet 280 housed in the interior of the candle body 201. The electromagnet 280 may include a coil comprising a conductor, such as wire or a trace on a printed circuit board. The electromagnet 280 is electrically coupled to the circuitry 290, which may be capable of controlling the polarity and intensity of the magnetic field generated by the electromagnet 280 by applying a suitable voltage across the electromagnet 280. The circuitry 290 may vary the magnetic field to cause the flame element 230 to move in a desired, but irregular manner.

Within the reservoir 210 and liquid 220, there is a magnet 270, which responds to the magnetic force applied by the electromagnet 280. When the magnet 270 receives this force, it moves within the liquid 220. This movement, in turn, perturbs the liquid 220, thereby causing the flame element 230 to move. The magnet 270 may have a toroidal shape or otherwise have an aperture that sits over the support 260. According to this arrangement, the magnet 270 can be secured such that magnetic coupling is more efficient, and the magnet 270 can be prevented from undue lateral motion. The magnet 270 may alternatively have other shapes, such as a bar, a rod, or an irregular shape.

Figure 6:
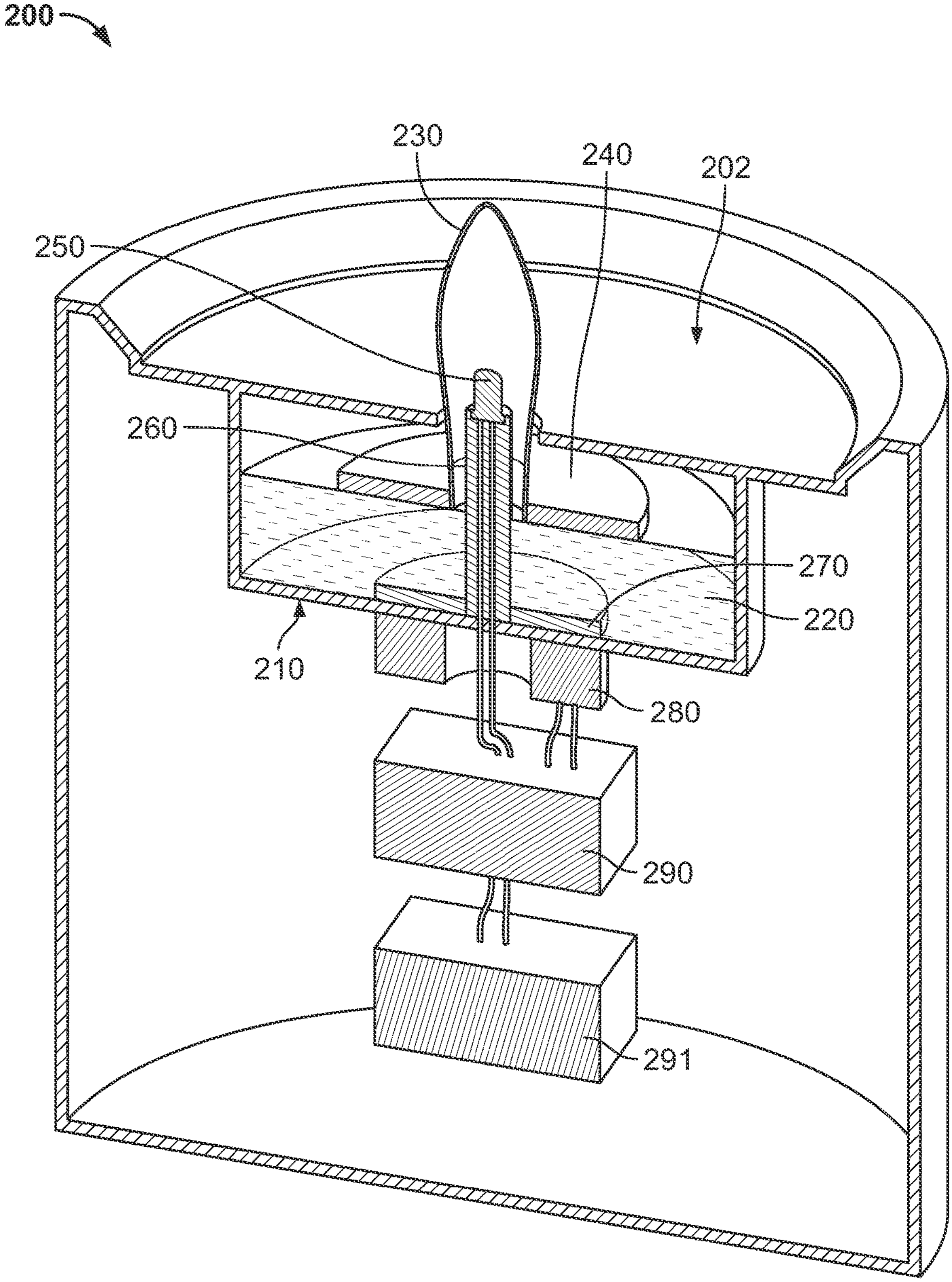

The candle 200 depicted in FIG. 6 is similar to the one of FIG. 5, except that an additional upper surface 202 is provided. The upper surface 202 includes an aperture through which the flame element 230 extends. The upper surface 202 may be integrated with the candle body 201 or it may be removable. The upper surface 202 may reduce undesirable leakage of liquid 220.

Figure 7:
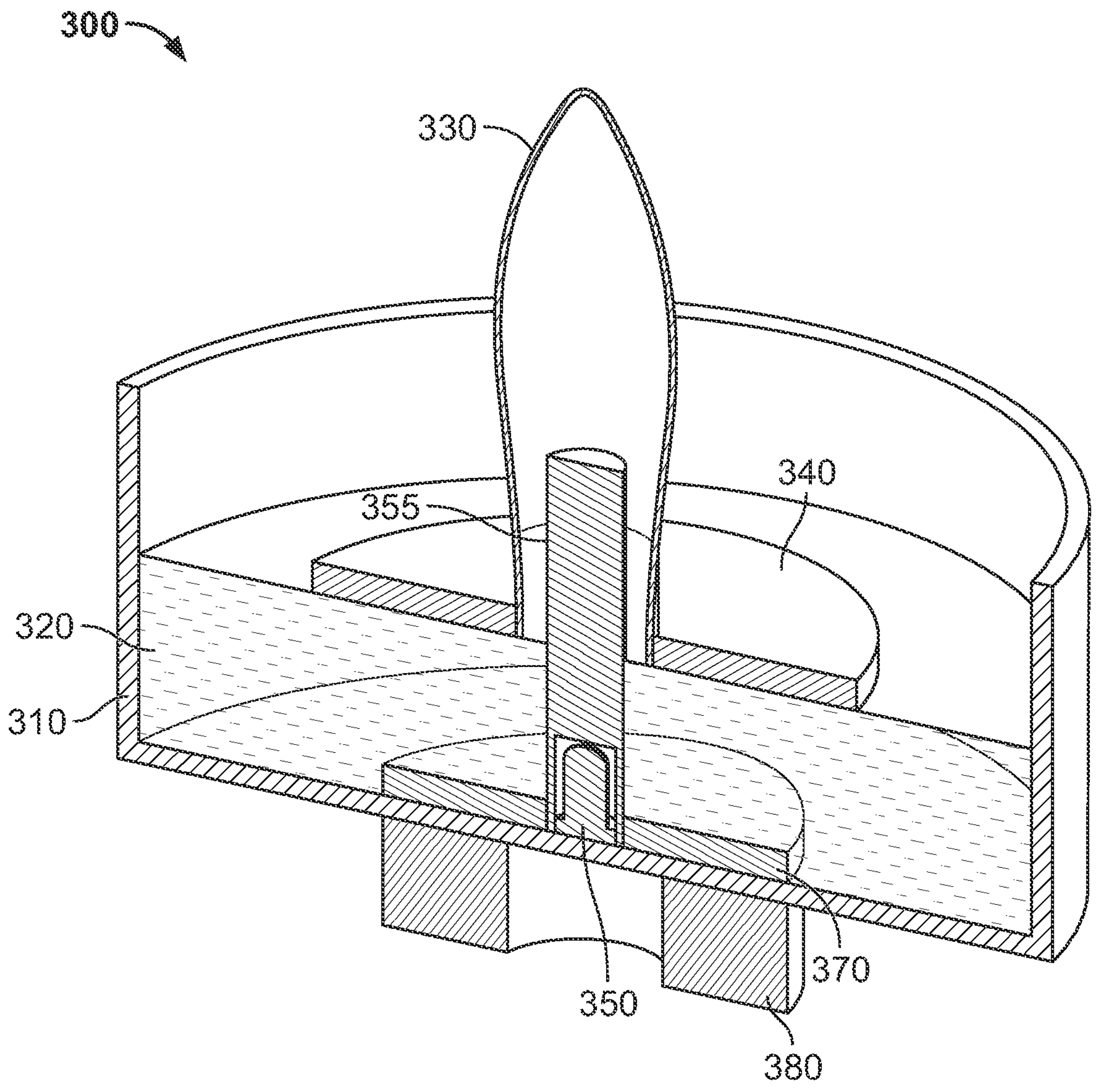

FIG. 7 illustrates a portion of a flameless candle 300 that is similar to those discussed above and depicted in FIGS. 5 and 6. Candle 300 includes a reservoir 310 containing a liquid 320. The flame element 330 is coupled to a flotation component 340, which floats on the liquid 320. An electromagnet 380 is positioned beneath the reservoir 310. A magnet 370 is located in the reservoir 310, and the electromagnet 380 magnetically interacts with the magnet 370 to perturb the liquid 320. In these respects, the candle 300 is similar to candle 200 of FIGS. 5 and 6. In candle 300, however, the light source 350 is positioned below the interior region of the flame element 330. A light pipe 355 extends upwardly from the light source 350 and into the interior region of the flame element 330. The light pipe 355 channels the light emitted from the light source 350 and conveys the light into the hollow interior region of the flame element 330. Thus, the light pipe 355 provides flexibility as to where the light source 350 can be located. The light pipe 355 further serves to constrain the lateral movement of the flame element 330. The light pipe 355 can also be located in a hole in magnet 370 to constrain the lateral movement of the magnet 370, similar to the technique described with respect to candle 200.

Figure 8:
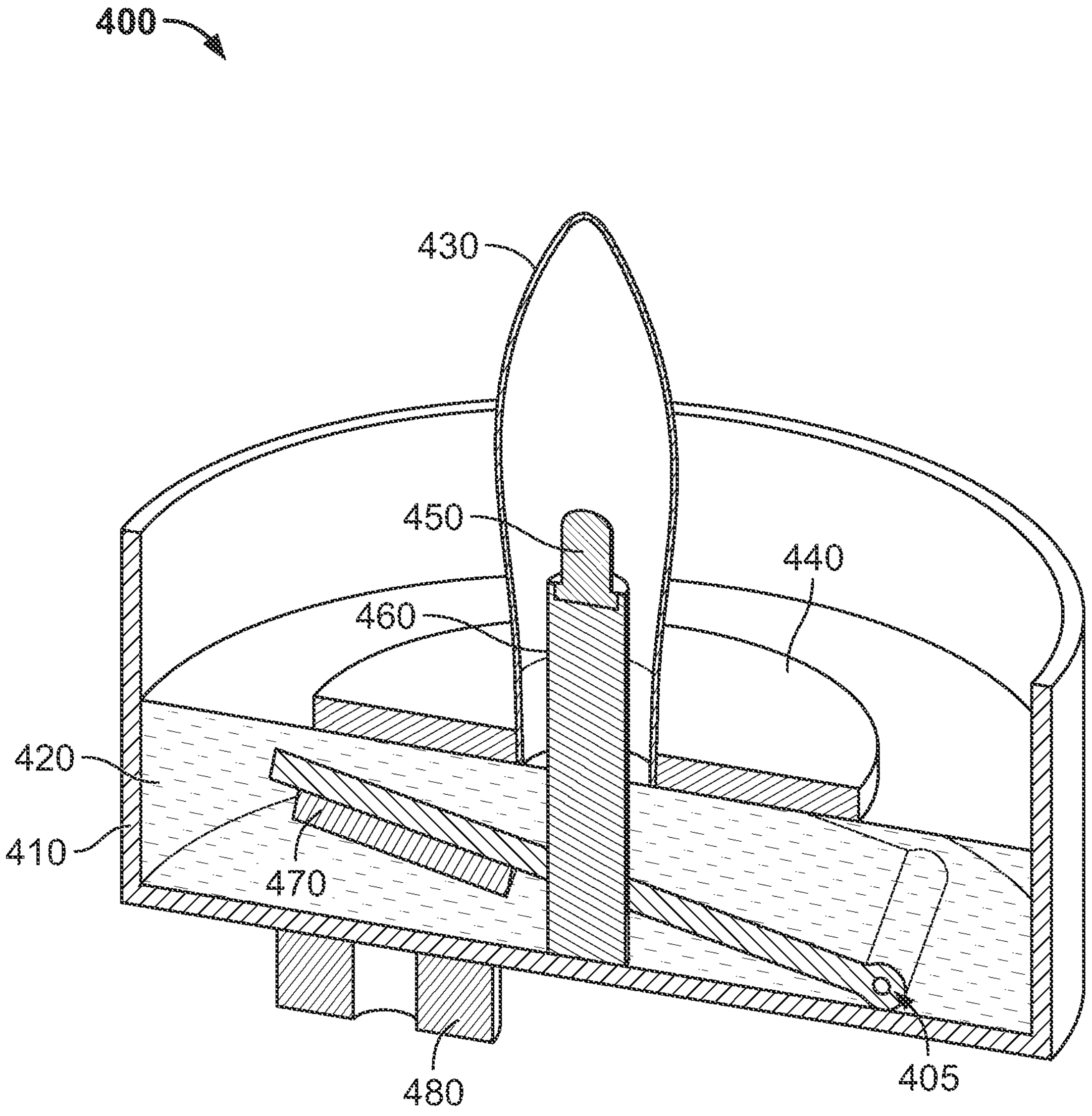

FIG. 8 illustrates a portion of a flameless candle 400 that is similar to those discussed above and depicted in FIGS. 5 and 6. Candle 400 includes a reservoir 410 containing a liquid 420. The flame element 430 is coupled to a flotation component 440, which floats on the liquid 420. A light source 450 is positioned within the hollow interior region of the flame element 430, and the light source 450 is supported by a support 460. An electromagnet 480 is positioned underneath the reservoir 410. In these respects, the candle 400 is similar to candle 200 of FIGS. 5 and 6. The magnet 470 in candle 400, however, is not positioned around the support 460. Instead, the magnet 470 is positioned on an arm 405, which is rotatably attached to another portion of the candle 400. The electromagnet 480 interacts with the magnet 470, thereby moving the magnet 470 and the arm 405. The motion of the magnet 470 and arm 405 perturbs the liquid 420, thereby causing the flame element 430 to move and simulate a true candle flame.

Figure 9:
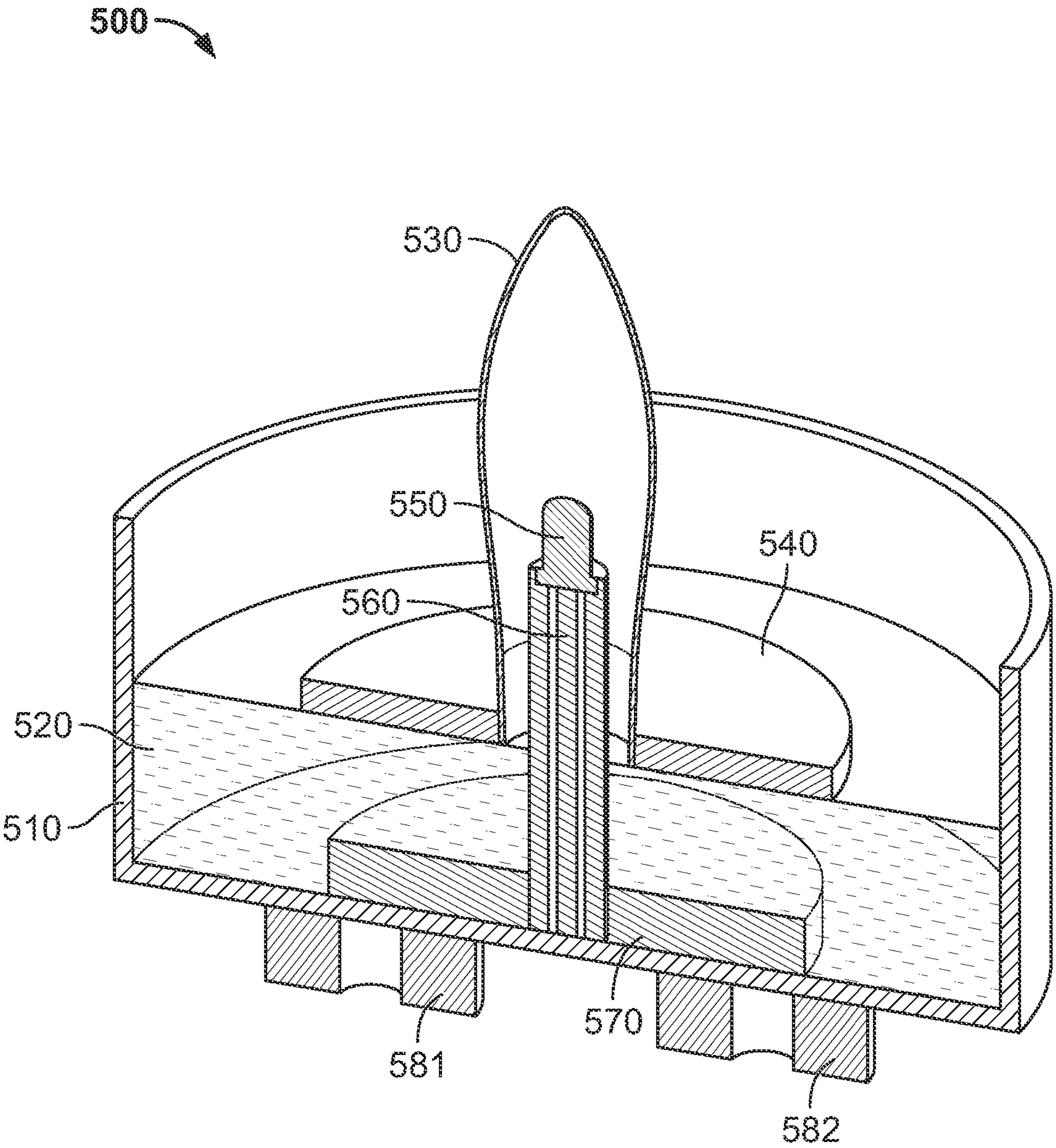

FIG. 9 illustrates a portion of a flameless candle 500 that is similar to those discussed above and depicted in FIGS. 5 and 6. It includes a reservoir 510, a liquid 520, a flame element 530, a flotation component 540, a light source 550, a support 560, and a magnet 570. Instead of having one electromagnet, however, candle 500 has two electromagnets 581 and 582. Each electromagnet 581, 582 can be separately controlled by the circuitry. The different electromagnets 581, 582, may be controlled or configured to interact with different poles of the magnet 570. For example, electromagnet 581 may be designed and controlled to interact with the North pole of magnet 570, whereas electromagnet 582 may be designed and controlled to interact with the South pole of magnet 570. Through appropriate control of the electromagnets 581, 582, it may be possible to cause the magnet 570 to wobble, move vertically, and/or or spin radially (i.e., spin around the support 560).

Figure 10:
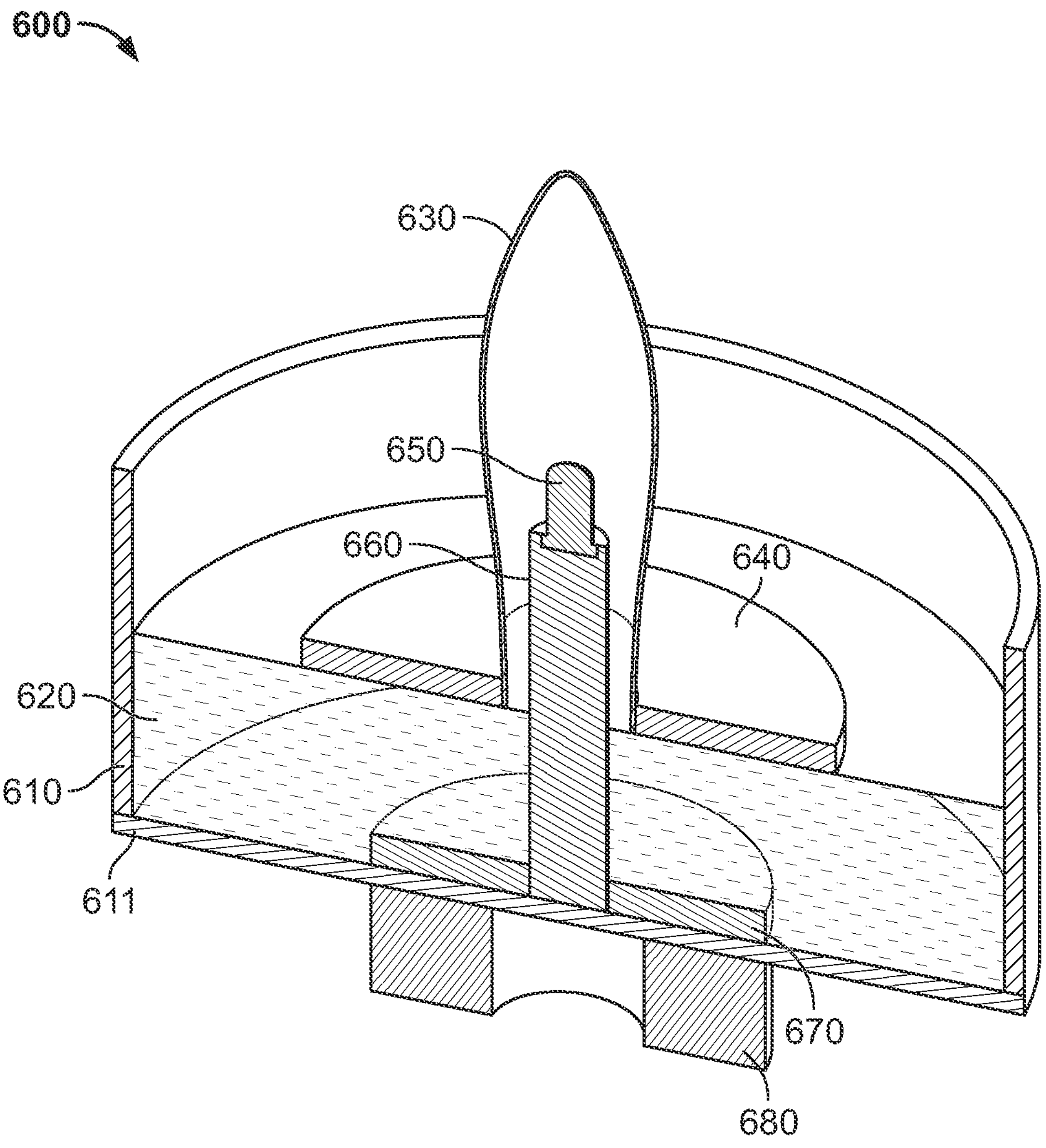

FIG. 10 illustrates a portion of a flameless candle 600 that is similar to those discussed above and depicted in FIGS. 5 and 6. It includes a reservoir 610, a liquid 620, a flame element 630, a flotation component 640, a light source 650, a support 660, a magnet 670, and an electromagnet 680. Flameless candle 600 differs in that the lower surface 611 of the reservoir 610 is an elastic membrane or diaphragm. Furthermore, the magnet 670 is coupled to the lower surface 611. Movement of the magnet 670, therefore, imparts movement to the lower surface 611. All of this motion perturbs the liquid 620 and the flame element 630 moves in response.

Figure 11:
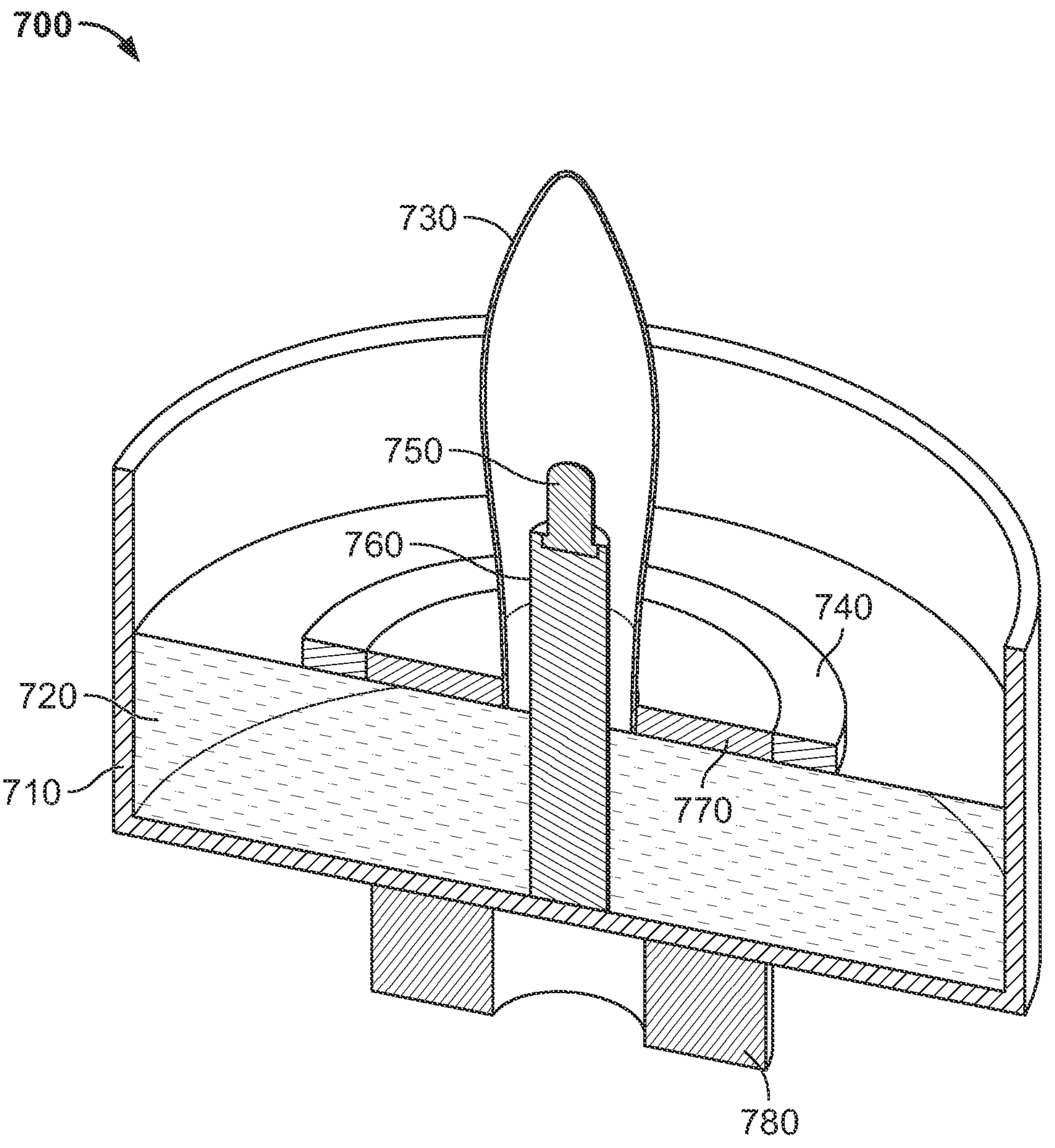

FIG. 11 illustrates a portion of a flameless candle 700 that is similar to those discussed above and depicted in FIGS. 5 and 6. The candle 700 includes a reservoir 710, a liquid 720, a flame element 730, a flotation component 740, a light source 750, a support 760, a magnet 770, and an electromagnet 780. The magnet 770, however, is now coupled to the flame element 730 and/or flotation component 740. The electromagnet 780 interacts with the magnet 770, which causes the flame element 730 to move without requiring the intermediate step of perturbing the liquid 720. As shown, the magnet 770 can be coupled between the flame element 730 and the flotation component 740. The magnet 770 could optionally be attached only to the flotation component 740. In this configuration, the flotation component 740 would be attached to the flame element 730 (or integrated therewith), while the magnet 770 would be attached to the flotation component 740 such that it would extend outwardly from the flotation component 740.

Figure 12:
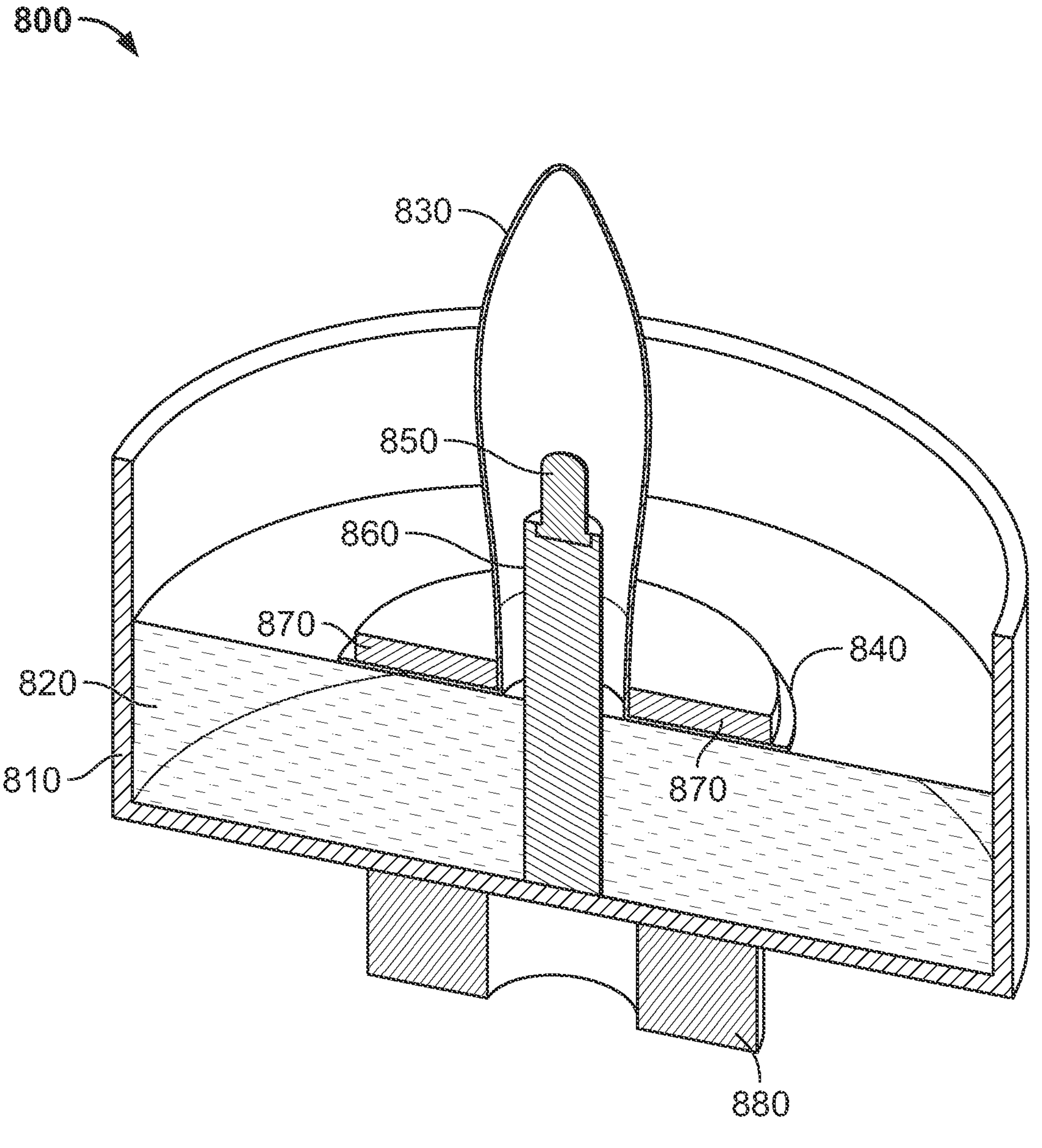

FIG. 12 illustrates a portion of a flameless candle 800, that is similar to the candle 700 discussed above and depicted in FIG. 11. The candle 800 includes a reservoir 810, a liquid 820, a flame element 830, a flotation component 840, a light source 850, a support 860, a magnet 870, and an electromagnet 880. As depicted, the flotation component 840 and the magnet 870 are stacked, such that the magnet 870 is positioned above the flotation component 840. Furthermore, the flotation component 840 is depicted as being integrated with the flame element 830.

Figure 13A:
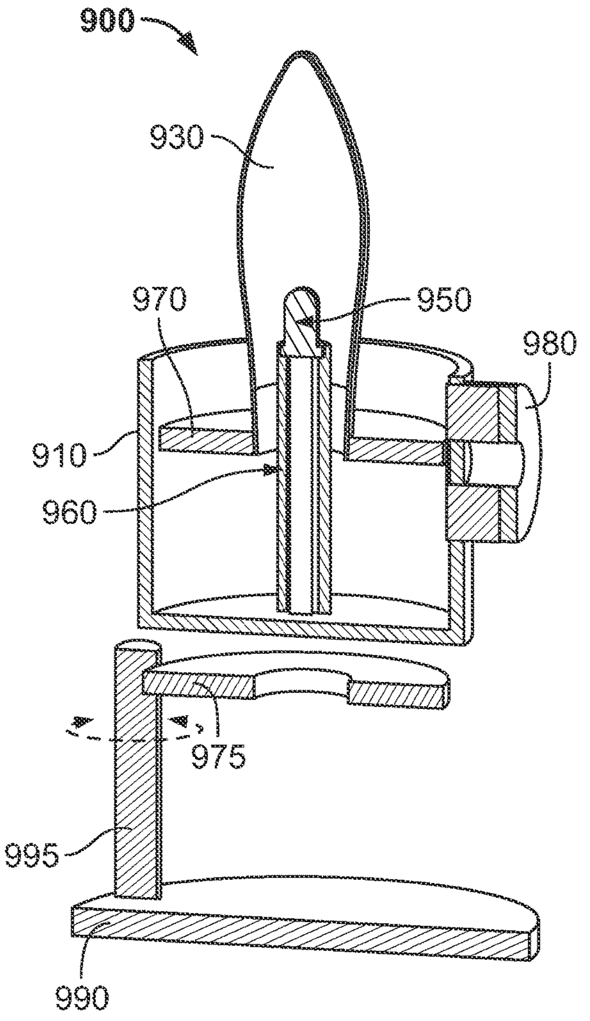
FIGS. 13A, 13B, 14, and 15 illustrate perspective views of the flameless candle with a flame element that magnetically levitates, according to techniques disclosed herein.
Figure 13B:
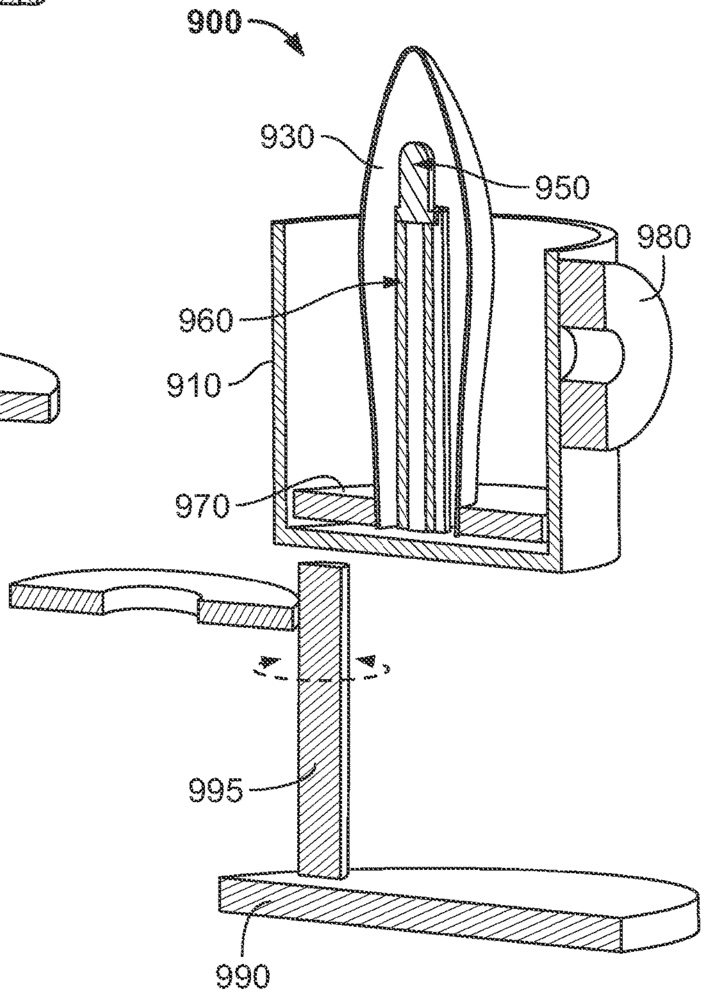

FIGS. 13A and 13B illustrate a portion of a flameless candle 900 that can be used with the overall structures shown in FIGS. 5 and 6. FIGS. 13A and 13B depict a flameless candle 900 that operates by magnetically levitating the flame element 930. FIG. 13A shows the flameless candle 900 in the ON state, and FIG. 13B shows the flameless candle 900 in the OFF state. Similar to the liquid-based candles, the levitating candle 900 includes a recess 910, a flame element 930, a light source 950, and a support 960. As with candles 700 and 800 (FIGS. 11 and 12), the magnet 970 is coupled to the flame element 930. Movement of the magnet 970, then, directly causes movement of the flame element 930. The magnet 970 and a portion of the flame element 930 are located in the recess 910. Underneath the recess 910, a rod 995 extends upwardly from a base 990. Coupled to the rod 995 is a magnet 975 configured to repel magnet 970. The rod 995 and/or the magnet 975 may be rotatable as shown in FIGS. 13A and 13B. The rod 995 and/or magnet 975 may be rotatable via a motor controlled by circuitry (not shown) or by manual means (not shown). When the magnet 975 is rotated such that it is underneath magnet 970, magnet 970 then levitates due to the repelling magnetic forces. In this manner, candle 900 is similar to candle 100, in that when the candle 900 is ON, the flame element 930 rises, and when the candle 900 is OFF, the flame element 930 falls back down. Thus, many of the same principles regarding candle 100 are equally applicable to candle 900 (e.g., the flame element 930 can extend upwardly through an aperture in the candle's upper surface when the candle is ON, the recess 910 can constrain lateral movement of the magnet 970 and attached flame element 930, and the like). Candle 900 further includes an electromagnet 980. As with the liquid-based candles, the electromagnet 980 interacts with magnet 970, thereby causing the flame element 930 to move in a desired manner. Consequently, three magnets 970, 975, and 980 can interact with each other to cause the flame element 930 to emulate the movement of a true candle flame.

Figure 14:
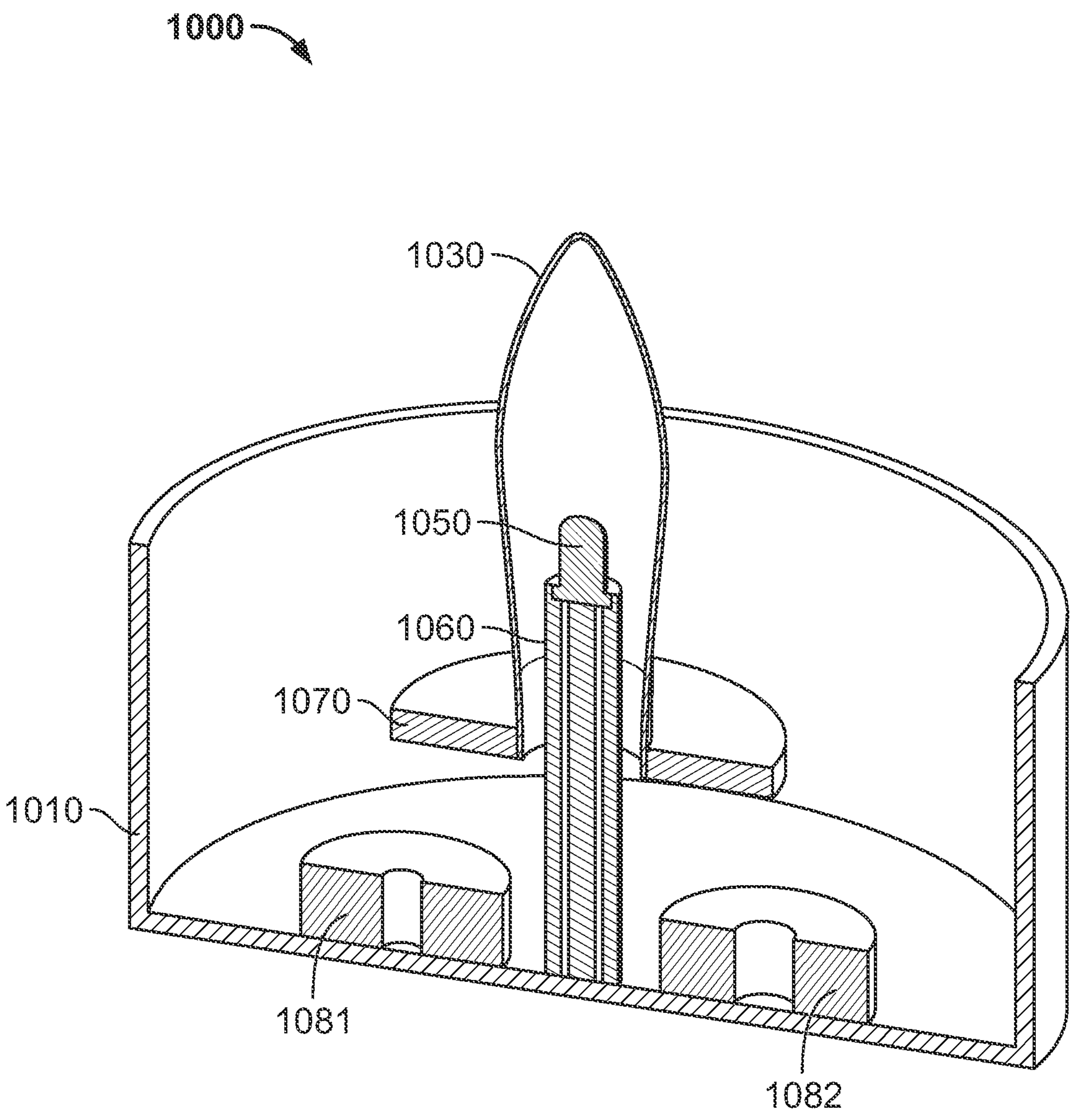

FIG. 14 illustrates a portion of a flameless candle 1000 that is in many ways similar to the preceding candles. Like candle 900, it operates by the principle of magnetic levitation. Similarly, the levitating candle 1000 includes a recess 1010, a flame element 1030, a light source 1050, and a support 1060. The magnet 1070 is coupled to the flame element 1030. Movement of the magnet 1070, then, directly causes movement of the flame element 1030. The magnet 1070 and a portion of the flame element 1030 are located in the recess 1010. In candle 1000, there are two electromagnets 1081 and 1082. The electromagnets 1081, 1082 can be positioned within the recess 1010 as shown or outside of the recess 1010 (e.g., underneath the recess 1010). As with candle 500 (FIG. 9), each electromagnet 1081, 1082 can be separately controlled by the circuitry. The different electromagnets 1081, 1082, may be controlled or configured to interact with different poles of the magnet 1070. For example, electromagnet 1081 may be designed and controlled to interact with the North pole of magnet 1070, whereas electromagnet 1082 may be designed and controlled to interact with the South pole of magnet 1070. By coordinating the operation of the electromagnets 1081, 1082, movement of the flame element 1030 can be induced in a desired manner.

Figure 15:
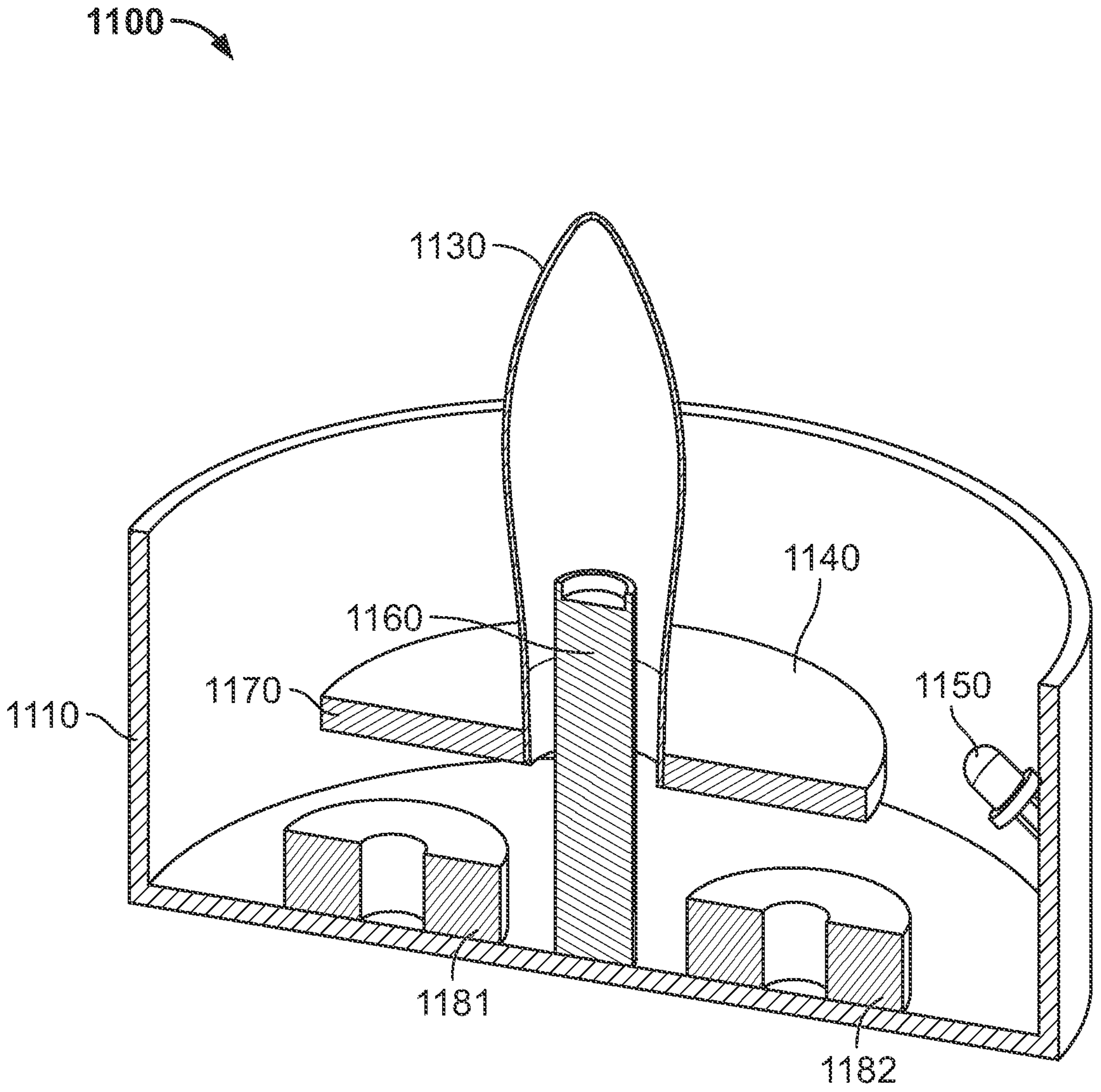

FIG. 15 illustrates a portion of a flameless candle 1100 that is in many ways similar to the preceding candles, and in particular candle 1000. Like candle 1000, it operates by the principle of magnetic levitation. Similarly, the levitating candle 1100 includes a recess 1110, a flame element 1130, a light source 1150, and a post 1160. The magnet 1170 is coupled to the flame element 1130. Movement of the magnet 1170, then, directly causes movement of the flame element 1130. The magnet 1170 and a portion of the flame element 1130 are located in the recess 1110. In candle 1100, there are two electromagnets 1181 and 1182. The electromagnets 1181, 1182 can be positioned within the recess 1110 as shown or outside of the recess 1110 (e.g., underneath the recess 1110). As with candle 1000, each electromagnet 1181, 1182 can be separately controlled by the circuitry. The different electromagnets 1181, 1182, may be controlled or configured to interact with different poles of the magnet 1170. For example, electromagnet 1181 may be designed and controlled to interact with the North pole of magnet 1170, whereas electromagnet 1182 may be designed and controlled to interact with the South pole of magnet 1170. By coordinating the operation of the electromagnets 1181, 1182, movement of the flame element 1130 can be induced in a desired manner.

Unlike candle 1000, however, the light source 1150 is positioned such that light is emitted onto the outer surface of the flame element 1130. Aside from its position in the candle 1100, light source 1150 may be similar to the aforementioned light sources. Additional light sources can be located at other positions around the flame element 1130, such that the flame element 1130 receives light from multiple different angles.

Figure 16:
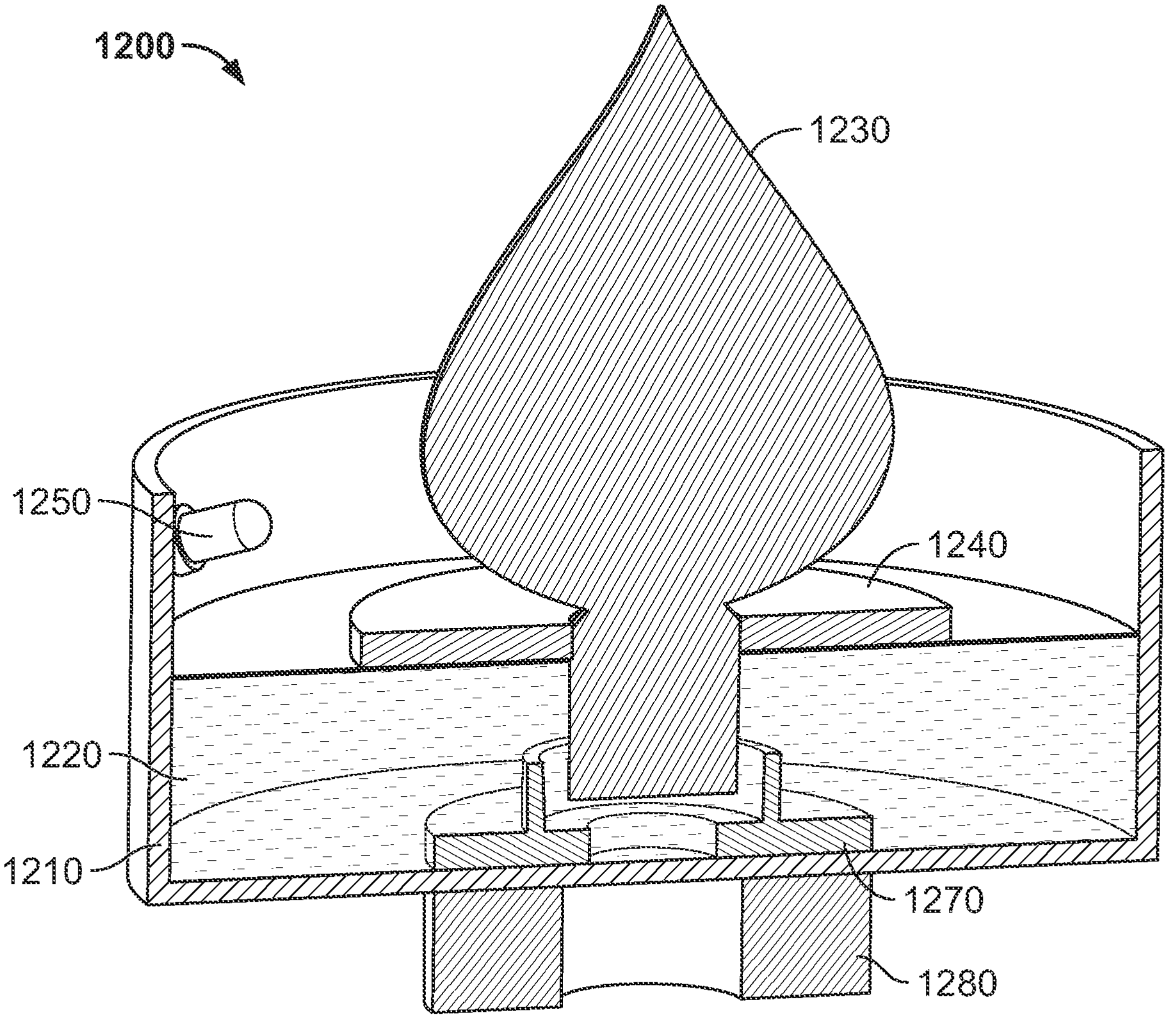
FIGS. 16, 17, 18, 19, 20, 21, and 22 illustrate perspective views of different flameless candles that include a flame element that floats on a liquid, according to techniques disclosed herein.

FIG. 16 illustrates a portion of a liquid-based candle 1200 that is similar to the above-described liquid-based candles. However, as with candle 1100, light is projected onto the exterior surface of the flame element. Like certain other liquid-based candles, candle 1200 includes a reservoir 1210, a liquid 1220, a flame element 1230, a flotation component 1240, a light source 1250, a magnet 1270, and an electromagnet 1280. Multiple light sources 1250 can optionally surround the flame element 1230. As with other liquid-based candles, the electromagnet 1280 imparts motion to the magnet 1270, which, in turn, perturbs the liquid 1220, thereby causing the flame element 1230 to move. The flame element 1230 may include a portion that extends into the liquid. This downwardly-extending portion may be constrained from lateral movement by one or more portions that project upwardly from the magnet 1270 or the lower surface of the reservoir 1210. The flame element 1230 may or may not have a hollow interior region. As depicted, the flame element 1230 does not have a hollow interior region. Unlike flame elements where light is projected internally, flame element 1230 may be opaque.

Figure 17:
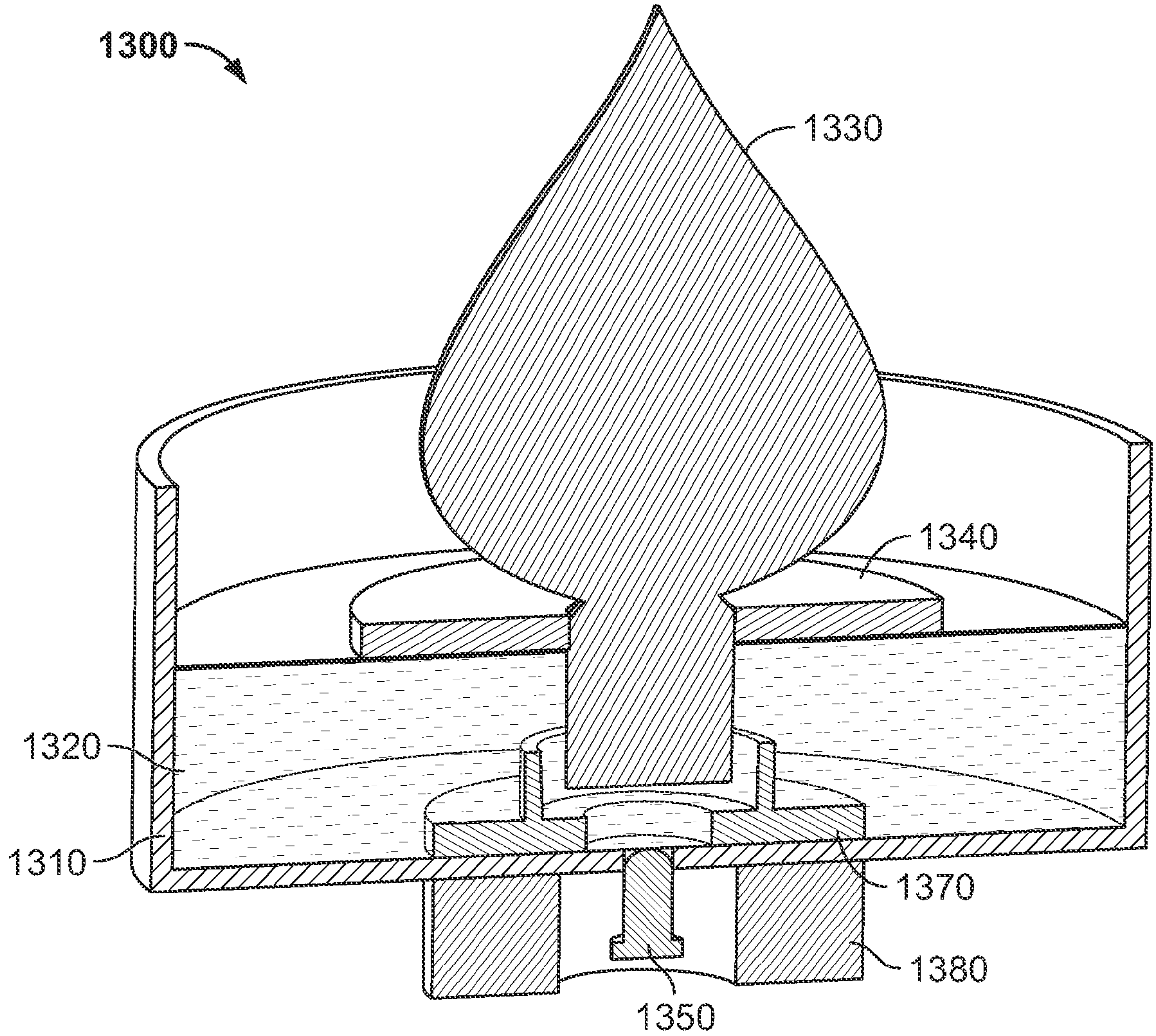

FIG. 17 illustrates a portion of a liquid-based candle 1300 that is similar to candle 1200. Like candle 1200, candle 1300 includes a reservoir 1310, a liquid 1320, a flame element

1330, a flotation component 1340, a light source 1350, a magnet 1370, and an electromagnet 1380. As with other liquid-based candles, the electromagnet 1380 imparts motion to the magnet 1370, which, in turn, perturbs the liquid 1320, thereby causing the flame element 1330 to move. The flame element 1330 may include a portion that extends into the liquid. This downwardly-extending portion may be constrained from lateral movement by one or more portions that project upwardly from the magnet 1370 or the lower surface of the reservoir 1310. The flame element 1330 may or may not have a hollow interior region. As depicted, the flame element 1330 does not have a hollow interior region. In the embodiment depicted in FIG. 17, the downwardly-extending portion of the flame element 1330 acts as a light pipe. The light source 1350 projects light into the light pipe and it is transferred upwardly and outwardly from upper portions of the flame element 1330.

Figure 18:
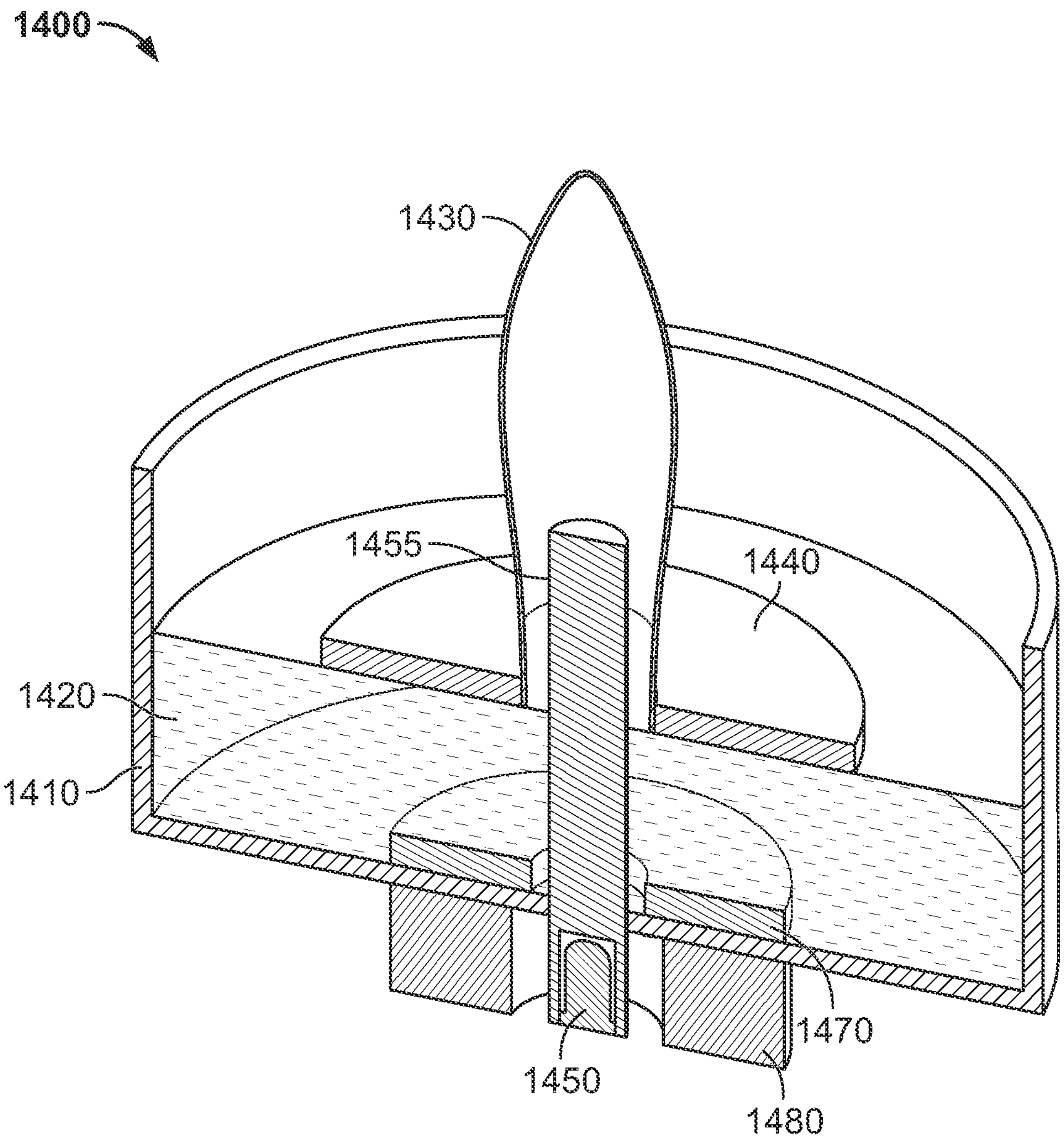

FIG. 18 illustrates a portion of a liquid-based candle 1400 that is similar to candle 300 (FIG. 7). Candle 1400 includes a reservoir 1410, a liquid 1420, a flame element 1430, a flotation component 1440, a light source 1450, a magnet 1470, and an electromagnet 1480. As with other liquid-based candles, the electromagnet 1480 imparts motion to the magnet 1470, which, in turn, perturbs the liquid 1420, thereby causing the flame element 1430 to move. Like candle 300, a light pipe 1455 is employed. In candle 1400, the light source 1450 is located underneath the reservoir 1410. The light pipe 1455 channels the light upwardly from the light source 1450 into the interior region of the flame element 1430.

Figure 19:
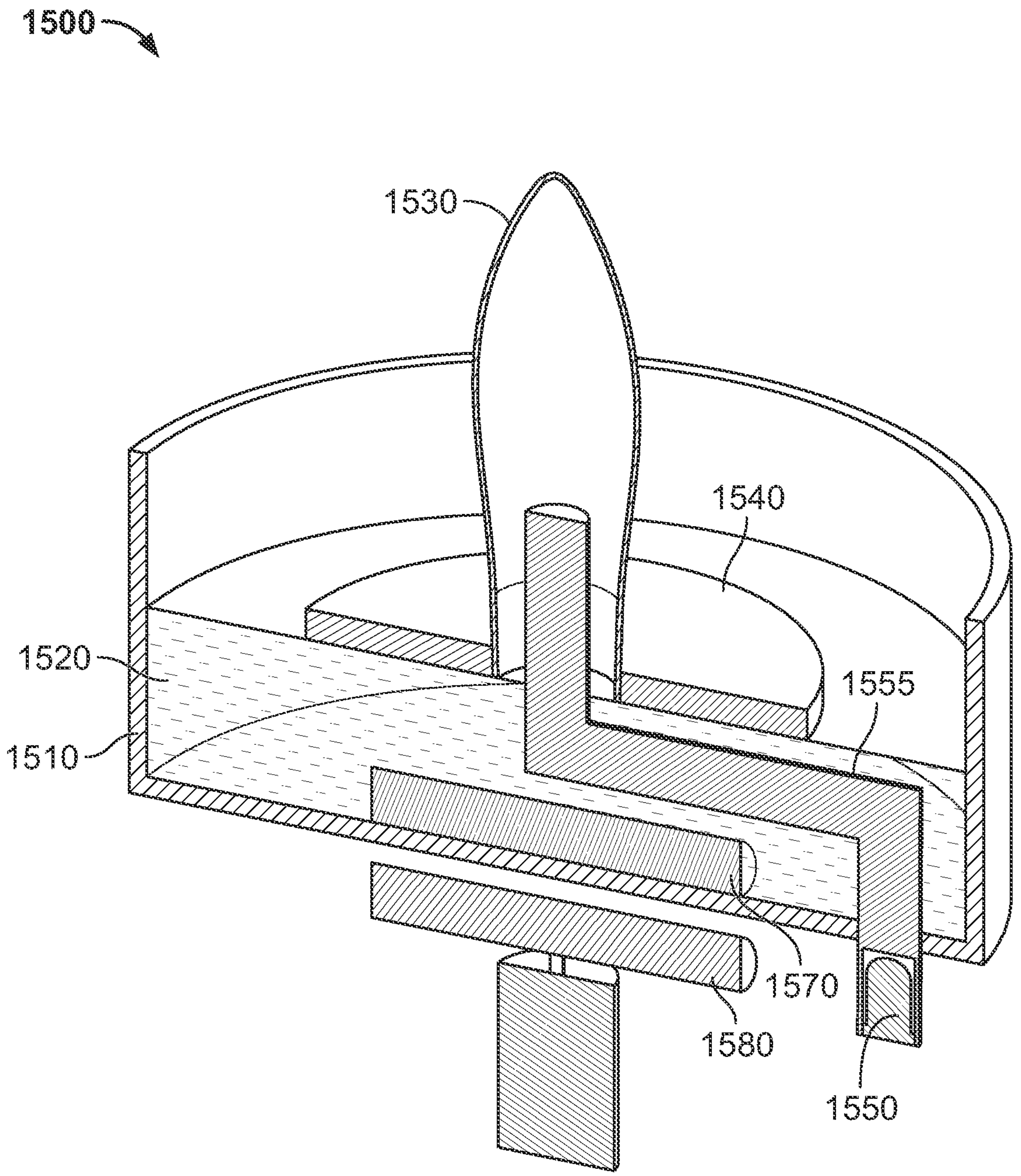

FIG. 19 illustrates a portion of a liquid-based candle 1500 that is similar to candle 1400 (FIG. 18). Candle 1500 includes a reservoir 1510, a liquid 1520, a flame element 1530, a flotation component 1540, a light source 1550, a magnet 1570, and a light pipe 1555. The light source 1550 is located underneath the reservoir 1510. The light pipe 1555 channels the light upwardly from the light source 1550 into the interior region of the flame element 1530. As with other liquid-based candles, the motion is imparted to the magnet 1570, which, in turn, perturbs the liquid 1520, thereby causing the flame element 1530 to move. In candle 1500, however, an electromagnet is not employed. Instead, a magnet 1580 is mounted to a motor. When the motor is turned ON, the magnet 1580 rotates or moves (for example, rotates 360 degrees clockwise and/or counterclockwise or only a portion thereof). This, in turn, causes the magnet 1570 to move (and thus causing flame element 1530 to move). The motor is electrically coupled to circuitry which controls the motor to achieve the desired result.

Figure 20:
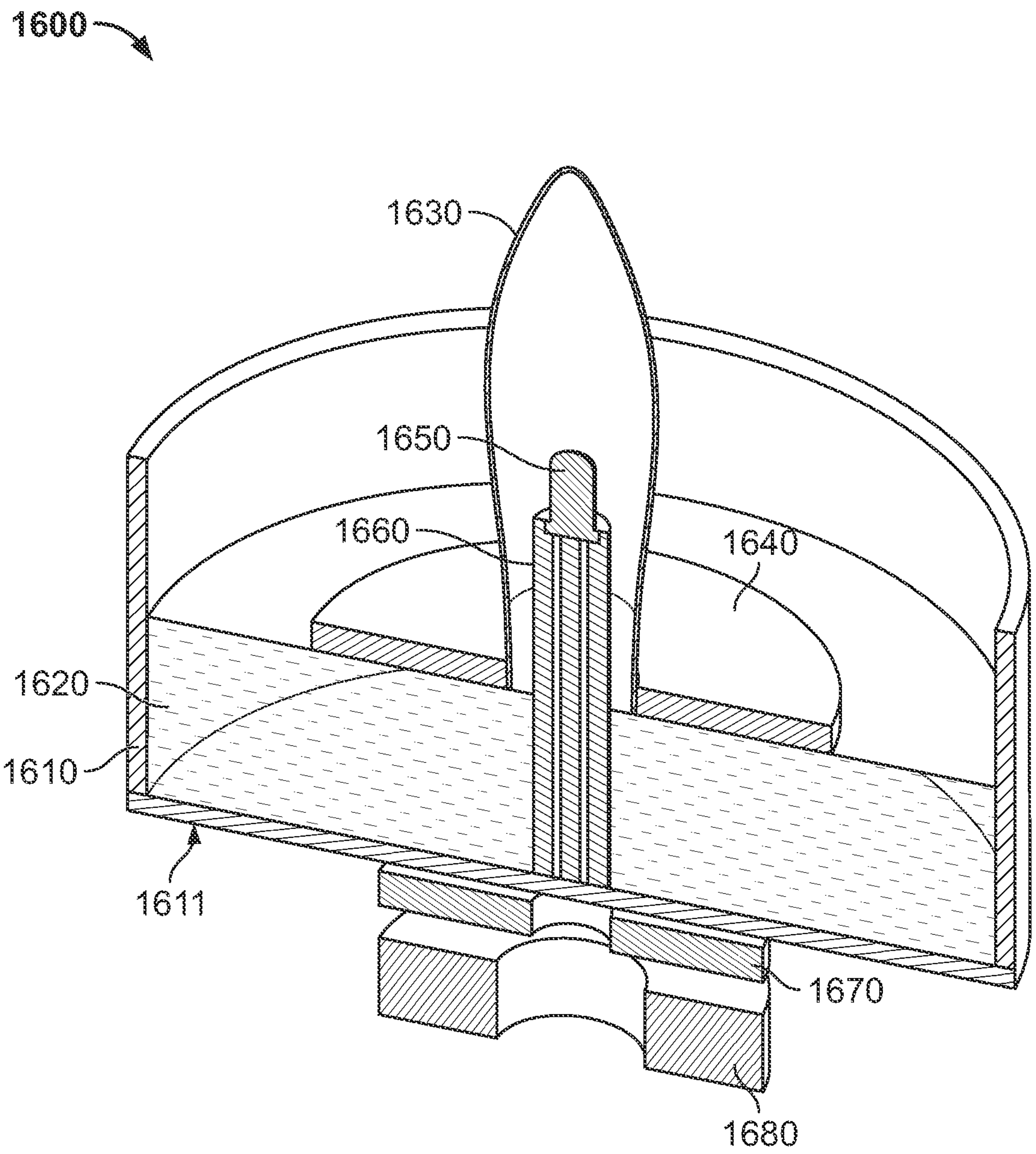

FIG. 20 illustrates a portion of a liquid-based candle 1600 that is similar to candle 600 (FIG. 10). Candle 1600 includes a reservoir 1610, a liquid 1620, a flame element 1630, a flotation component 1640, a light source 1650, a support 1660, a magnet 1670, and an electromagnet 1680. Flameless candle 1600 has a reservoir 1610 with a lower surface 1611 that includes or is an elastic membrane or diaphragm. Like candle 600, the magnet 1670 is coupled to the lower surface 1611. Movement of the magnet 1670, therefore, imparts movement to the lower surface 1611. All of this motion perturbs the liquid 1620, and the flame element 1630 moves in response. In candle 1600 (unlike candle 600), the magnet 1670 is under the lower surface 1611.

Figure 21:
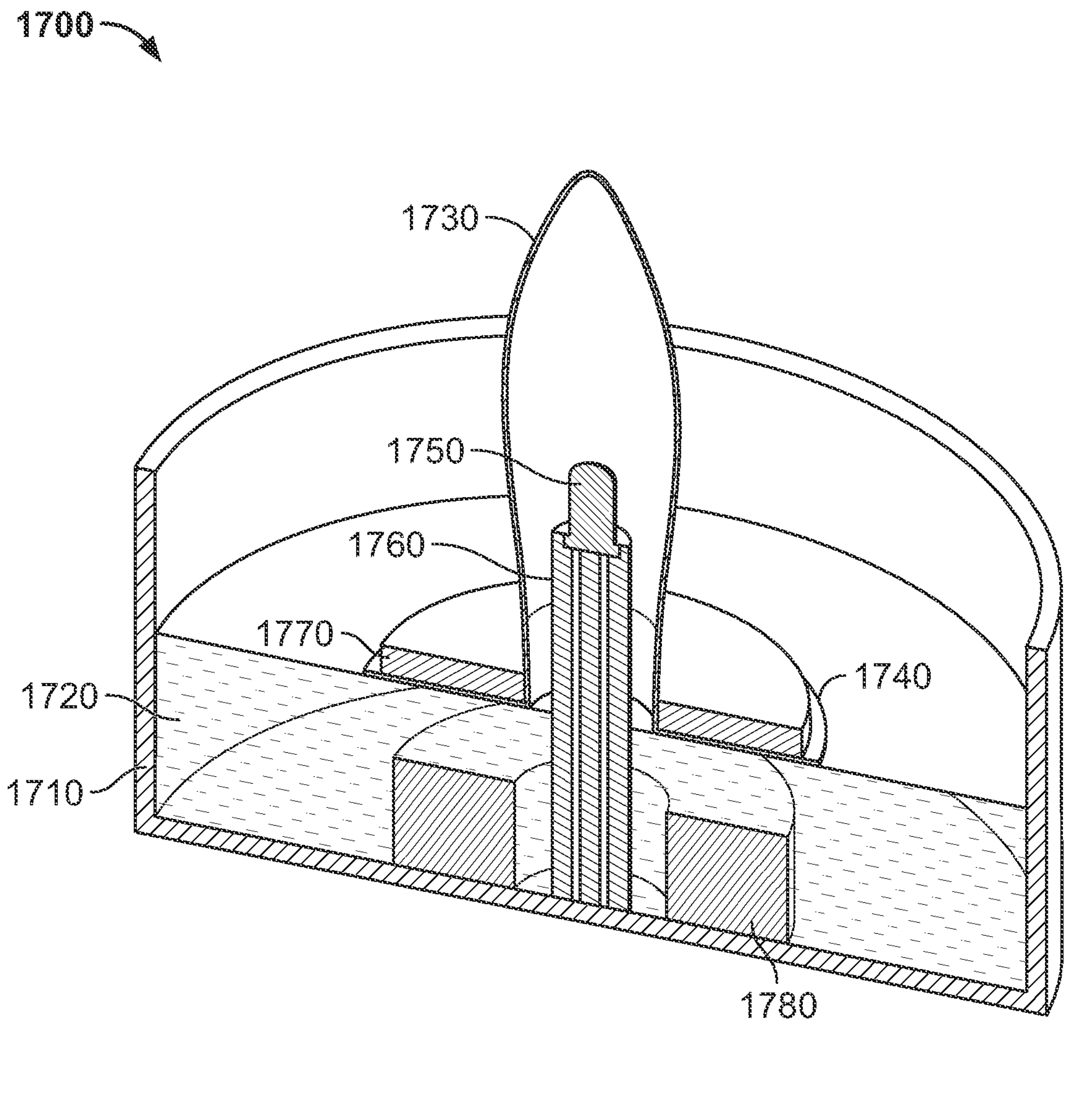

FIG. 21 illustrates a portion of a liquid-based candle 1700 that is similar to candle 800 (FIG. 12). Candle 1700 includes a reservoir 1710, a liquid 1720, a flame element 1730, a flotation component 1740 (integrated with the flame element 1730), a light source 1750, a support 1760, a magnet 1770, and an electromagnet 1780. As depicted, the flotation component 1740 and the magnet 1770 are stacked, such that the magnet 1770 is positioned above the flotation component 1740. Candle 1700 differs from candle 800 in that the electromagnet 1780 is located within the reservoir 1710.

Figure 22:
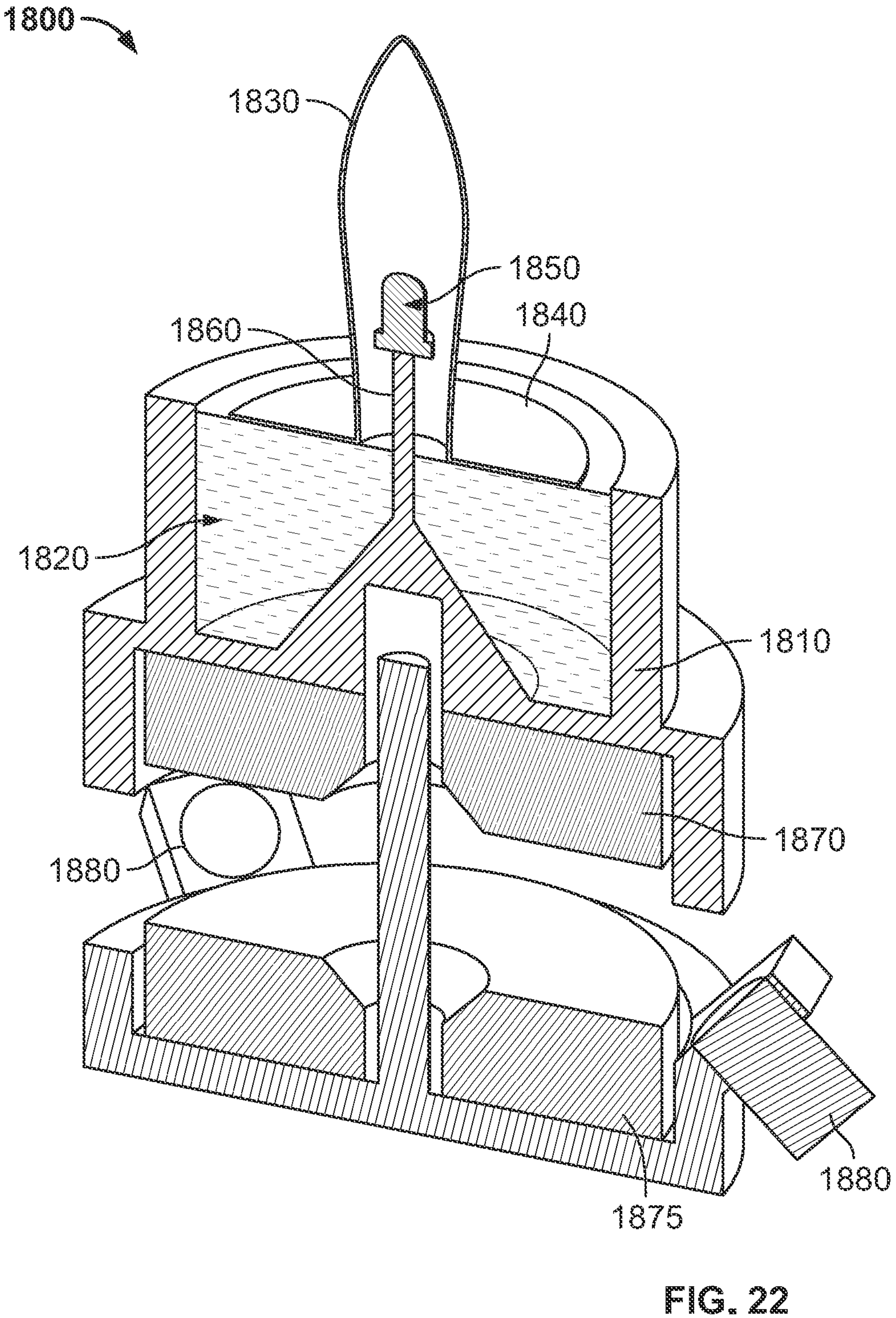

FIG. 22 illustrates a portion of a candle 1800, which combines liquid-type and levitation-type techniques. In candle 1800, the entire reservoir 1810 is levitated and shaken. The candle 1800 includes a reservoir 1810, a liquid 1820, a flame element 1830, a flotation component 1840, a light source 1850, a support 1860, a magnet 1870, a magnet 1875, and one or more electromagnets 1880. The reservoir 1810 is seated on magnet 1870, which is levitated by the repellant interaction with magnet 1875. As the magnet 1870 is levitated, so is the reservoir 1810. A post extends upwardly through the magnet 1870 and into a recess on the underside of the reservoir 1810. The post constrains lateral and downward movement of the reservoir 1810. The electromagnets 1880 are controllable (together or separately) to perturb magnet 1870, thereby causing it to move. In response, the reservoir 1810 moves causing the liquid to move 1820. In turn the flame element 1830 moves. Magnet 1875 can optionally be an electromagnet and can be selectively turned ON or OFF to elevate or lower the flame element 1830.

As will be appreciated, the various techniques described herein may be used together even if not explicitly stated. For example, magnets can be swapped out for electromagnets or vice versa. As another example, light pipes can be substituted (or vice versa) and light sources repositioned. Flame elements with internal projection can be substituted for those that are illuminated via external projection. As another example, magnets and/or electromagnets can be used in conjunction with the air-based candle techniques. These are but a few examples, and it will be appreciated that a given feature is not applicable only to a specifically described embodiment. The features can be mixed as will be appreciated. Additionally, the candles disclosed herein may incorporate fragrance releasing elements that, for example, are in the liquid or are imparted to the environment via air flow of the fan.

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. A flameless candle comprising:

a candle body including an inner region and an upper surface with an aperture;

a light source that selectively emits a light by being energized and de-energized; and a flame element that receives the light from the light source, the flame element being movable with respect to the candle body, movement of the flame element including vertical movement and rotation, a majority of the flame element being retractable into the aperture in the upper surface of the candle body when the light source is de-energized and extendable through the aperture in the upper surface of the candle body when the light source is energized.

2. The flameless candle of claim 1, further comprising:
at least one first magnet; and
a second magnet coupled to the flame element at a location where operation of the at least one first magnet causes the second magnet and the flame element to move.

3. The flameless candle of claim 2, wherein the at least one first magnet comprises an electromagnet.

4. The flameless candle of claim 2, wherein the at least one first magnet moves relative to the candle body.

5. The flameless candle of claim 1, wherein the light source is surrounded by a sheath.

6. The flameless candle of claim 5, wherein the sheath surrounds only a part of the light source.

7. The flameless candle of claim 1, wherein the light emitted by the light source has a different color than a light emitted from the flame element.

8. The flameless candle of claim 1, wherein a shape of the flame element includes at least one feature including at least one of a ridge, rip, protrusion, or recess that distorts the light from the light source.

9. The flameless candle of claim 1, wherein a bottom of the flame element has a maximum elevation which is less than an elevation of the upper surface of the candle body.

10. A flameless candle comprising:
a candle body including an inner region and an upper surface with an aperture;
a light source that selectively emits a light;
a fan that functions in concert with the light source to selectively operate only when the light source emits the light; and
a flame element that receives the light and moves in response to airflow generated by the fan, a center of the flame element being located at a first elevation below the upper surface of the candle body before and after the fan operates and the center of the flame element being located at least at a second elevation in which a majority of the flame element protrudes beyond the upper surface of the candle body while the fan operates, the second elevation being greater than the first elevation.

11. The flameless candle of claim 10, wherein the light emitted by the light source comprises flickering light.

12. The flameless candle of claim 10, wherein the fan operates at a variable speed to position the flame element at a plurality of elevations that are the same as or greater than the second elevation.

13. The flameless candle of claim 10, wherein the light source is located within the flame element.

14. The flameless candle of claim 10, wherein the light source is outside of the flame element.

15. The flameless candle of claim 10, further comprising a light pipe that routes at least a portion of the light emitted from the light source towards the flame element.

16. The flameless candle of claim 10, further comprising:
a lens that alters a shape of a beam of the light emitted from the light source.

17. The flameless candle of claim 10, wherein the flameless candle accepts a fragrance releasing element that releases a fragrance into the environment via the airflow generated by the fan.

18. The flameless candle of claim 10, further comprising:
an airflow director including a sidewall defining an interior region that receives the airflow from the fan, the airflow director being spaced apart from an outer wall of the candle body.

19. The flameless candle of claim 10, wherein a bottom of the flame element has a maximum elevation which is less than an elevation of the upper surface of the candle body.

* * * * *